United States Patent
Stewart et al.

(10) Patent No.: US 12,185,666 B2
(45) Date of Patent: Jan. 7, 2025

(54) WEED TRIMMER APPARATUS AND SYSTEM

(71) Applicant: William Shaw Stewart, Rainbow City, AL (US)

(72) Inventors: William Shaw Stewart, Rainbow City, AL (US); Adam Loren Freund, Bozeman, MT (US)

(*) Notice: Subject to any disclaimer, the term of this patent is extended or adjusted under 35 U.S.C. 154(b) by 0 days.

(21) Appl. No.: 18/327,113

(22) Filed: Jun. 1, 2023

(65) Prior Publication Data

US 2024/0341225 A1    Oct. 17, 2024

Related U.S. Application Data

(60) Provisional application No. 63/495,580, filed on Apr. 12, 2023.

(51) Int. Cl.
*A01D 34/90* (2006.01)
*A01D 34/416* (2006.01)
*A45F 3/14* (2006.01)

(52) U.S. Cl.
CPC ....... *A01D 34/902* (2013.01); *A01D 34/4167* (2013.01); *A45F 3/14* (2013.01); *A45F 2003/142* (2013.01)

(58) Field of Classification Search
CPC .... A01D 34/90; A01D 34/902; A01D 34/416; A01D 34/4167
See application file for complete search history.

(56) References Cited

U.S. PATENT DOCUMENTS 3,346,955 A * 10/1967 Beneke ............... A01G 3/053
                                                    30/296.1
3,919,615 A    11/1975 Niecke
(Continued)

FOREIGN PATENT DOCUMENTS

CN    210352198 U    4/2020
DE    29903963 U1    7/1999
(Continued)

OTHER PUBLICATIONS

Battery Belt With Double Harness | Battery Storage | STIHL USA, "Battery Belt With Double Shoulder Harness", JC Licht Ace Hardware-Bridgeport, https://www.stihlusa.com/products/batteries-chargers/accessories/batterybeltharness/, Retrieved: Oct. 2, 2023, 14 pgs.

(Continued)

*Primary Examiner* — Adam J Eiseman
*Assistant Examiner* — Richard D Crosby, Jr.
(74) *Attorney, Agent, or Firm* — BEKIARES ELIEZER LLP

(57) ABSTRACT

The present disclosure provides a weed trimmer apparatus including: a belt having: a power clip first portion, a belt power source, a plurality of second power transmission wires extending through the belt and electrically connecting the belt power source to the power clip first portion, a belt clip; a trimmer including: a trimmer base having: a motor, a trimmer power source receiver, a shaft, a debris shield, a trimmer head secured below the debris shield, a plurality of cutting swaths, a first handle portion extending orthogonally from the shaft, a second handle extending from the first handle and configured to axially rotate around the first handle; and a power source configured to secure to either the first power source receiver or the trimmer, wherein the power source, when secured to the trimmer power source (Continued)

receiver, is configured to provide electrical output to the motor of the trimmer.

20 Claims, 22 Drawing Sheets

(56) References Cited

U.S. PATENT DOCUMENTS

| | | | | |
|---|---|---|---|---|
| 4,006,528 | A * | 2/1977 | Katsuya | B27B 9/00 |
| | | | | 192/17 R |
| 4,827,534 | A * | 5/1989 | Haugen | H02S 40/38 |
| | | | | 2/108 |
| 5,095,259 | A | 3/1992 | Bailey et al. | |
| 5,211,321 | A | 5/1993 | Rodriguez | |
| 5,501,379 | A | 3/1996 | Munoz | |
| 5,620,121 | A * | 4/1997 | Watson | F16M 13/04 |
| | | | | 224/904 |
| 5,636,444 | A * | 6/1997 | Nickel | F16D 49/08 |
| | | | | 192/17 R |
| 5,680,026 | A * | 10/1997 | Lueschen | A45F 5/00 |
| | | | | 320/112 |
| 5,913,464 | A * | 6/1999 | Haberlein | A45F 3/14 |
| | | | | 224/907 |
| 6,007,940 | A | 12/1999 | Spotnitz | |
| 6,066,211 | A * | 5/2000 | Sandell | H01M 50/247 |
| | | | | 15/327.5 |
| 6,158,636 | A * | 12/2000 | Latiolais | A01D 34/902 |
| | | | | 224/257 |
| 6,501,197 | B1 * | 12/2002 | Cornog | H02J 7/0045 |
| | | | | 429/123 |
| 6,640,444 | B1 * | 11/2003 | Harada | F02B 63/02 |
| | | | | 83/DIG. 1 |
| 6,823,591 | B2 * | 11/2004 | Kobayashi | F02B 63/02 |
| | | | | 30/277.4 |
| 8,415,917 | B1 * | 4/2013 | Faris | H02J 7/0045 |
| | | | | 224/163 |
| 8,857,682 | B2 * | 10/2014 | Nakaya | A01D 34/90 |
| | | | | 224/268 |
| 9,035,596 | B2 * | 5/2015 | Sugiura | H01M 50/204 |
| | | | | 320/112 |
| 9,689,126 | B2 | 6/2017 | Barth et al. | |
| 10,039,367 | B2 * | 8/2018 | Yamaoka | A47L 5/14 |
| 10,230,077 | B2 * | 3/2019 | Rief | H01M 50/247 |
| 10,813,437 | B2 | 10/2020 | Behringer et al. | |
| 10,814,469 | B2 * | 10/2020 | Schulz | B25F 5/02 |
| 10,892,626 | B2 * | 1/2021 | Rief | B25F 5/02 |
| 10,932,547 | B2 | 3/2021 | Lennings et al. | |
| 11,039,570 | B2 * | 6/2021 | Takahashi | A01G 3/088 |
| 11,601,002 | B2 * | 3/2023 | Gao | H02J 7/0063 |
| 2003/0121682 | A1 * | 7/2003 | Carrancho | B25F 5/02 |
| | | | | 173/217 |
| 2006/0112572 | A1 * | 6/2006 | McCambridge | B26B 19/3873 |
| | | | | 30/537 |
| 2006/0244414 | A1 * | 11/2006 | Lay | H01M 50/503 |
| | | | | 320/107 |
| 2007/0214656 | A1 * | 9/2007 | Gray | B26B 27/007 |
| | | | | 30/298 |
| 2008/0012526 | A1 * | 1/2008 | Sadow | H02J 7/0044 |
| | | | | 320/111 |
| 2008/0083079 | A1 * | 4/2008 | Starrette | B24B 29/02 |
| | | | | 15/97.1 |
| 2009/0090755 | A1 * | 4/2009 | Menzel | A45F 3/14 |
| | | | | 224/268 |
| 2012/0048588 | A1 * | 3/2012 | Iyoda | H01M 50/20 |
| | | | | 173/217 |
| 2012/0052356 | A1 * | 3/2012 | Sugiura | H01M 50/244 |
| | | | | 429/100 |
| 2013/0119101 | A1 * | 5/2013 | Hachisuka | A01D 34/902 |
| | | | | 224/261 |
| 2014/0000922 | A1 * | 1/2014 | Pellenc | B25F 5/00 |
| | | | | 173/46 |
| 2014/0009857 | A1 * | 1/2014 | Suzuki | H01M 10/615 |
| | | | | 361/87 |
| 2014/0050963 | A1 * | 2/2014 | Ishikawa | A01D 34/902 |
| | | | | 429/96 |
| 2014/0115835 | A1 * | 5/2014 | Kolb | A44B 11/00 |
| | | | | 24/265 R |
| 2014/0140861 | A1 * | 5/2014 | Pellenc | F04D 25/0673 |
| | | | | 417/63 |
| 2014/0159640 | A1 * | 6/2014 | Yoshikawa | H02J 7/0044 |
| | | | | 320/112 |
| 2015/0013619 | A1 * | 1/2015 | Kahana, Jr. | A01K 1/04 |
| | | | | 119/770 |
| 2015/0041512 | A1 * | 2/2015 | Rief | H01M 50/247 |
| | | | | 429/96 |
| 2015/0042280 | A1 * | 2/2015 | Rief | H02J 7/0044 |
| | | | | 320/113 |
| 2015/0188332 | A1 * | 7/2015 | Nakano | H02J 7/342 |
| | | | | 320/112 |
| 2015/0194647 | A1 | 7/2015 | Yoshinari et al. | |
| 2018/0116378 | A1 * | 5/2018 | Schindler | B25H 1/0028 |
| 2019/0082814 | A1 * | 3/2019 | Behringer | A45F 3/14 |
| 2019/0110396 | A1 | 4/2019 | Bringhurst et al. | |
| 2020/0253360 | A1 | 8/2020 | Hahn et al. | |

FOREIGN PATENT DOCUMENTS

| | | |
|---|---|---|
| GB | 2383765 A | 7/2003 |
| WO | 2019206875 A1 | 10/2019 |

OTHER PUBLICATIONS

Greenworks Commercial AWP-100 82V Commercial Battery Waist Pack Harness (Battery & Charger Not Included), Replacement Commercial Parts Warehouse, https://www.rcpw.com/greenworks-commercial-awp-100-82v-commercial-battery-waist-pack-harness-battery-and-charger-not-included/?gclid=CjwKCAiA85efBhBbEiwAD7oLQB4pl67d-Jc1kmJuR-KJW-znO21yff6Td . . . , Retrieved: Oct. 2, 2023, 6 pgs.

Husqvarna Battery belt FLEXI | Husqvarna US, https://www.husqvarna.com/US/battery-series-accessories/battery-belt-flexi/, Retrieved: Oct. 2, 2023, 5 pgs.

* cited by examiner

WEED TRIMMER APPARATUS AND SYSTEM

RELATED APPLICATION

Under provisions of 35 U.S.C. § 119(e), the Applicant claims benefit of U.S. Provisional Application No. 63/495,580 filed on Apr. 12, 2023, and having inventors in common, which is incorporated herein by reference in its entirety.

It is intended that the referenced application may be applicable to the concepts and embodiments disclosed herein, even if such concepts and embodiments are disclosed in the referenced application with different limitations and configurations and described using different examples and terminology.

FIELD OF DISCLOSURE

The present disclosure generally relates to modular power tools, brush and debris removal, and ergonomic configurations.

BACKGROUND

In some situations, clearing brush and removing undesirable plants and weeds are needed. Generally, motorized weed trimmers used for clearing brush and landscaping have existed. For example, landscapers and homeowners may have weeds and/or brush in areas unreachable to other landscaping equipment like lawnmowers. Thus, the conventional strategy is to use a handheld device such as a weed trimmer, allowing for more physical control by a user with improved accuracy of trimming. This often causes problems because the conventional strategy does not account for prolonged use, thereby causing unwanted soreness and muscular stress due to non-ergonomic designs of weed trimmers. Though some weed trimmers have more ergonomic handles and other forms to alleviate the weight and torque exerted on a user while in use, certain tasks requiring a weed trimmer may require different operative positions of the user to achieve the desired results. A weed trimmer having more user-friendly ergonomic elements, improved modularity, and easier adjustability, is needed.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

The present disclosure provides a weed trimmer apparatus comprising: a belt configured to be secured around a user's waist, the belt portion comprising: a power clip first portion secured to a first clip strap extending from an outer surface of the belt, a belt power source receiver disposed on the outer surface of the belt opposing the power clip first portion, a plurality of second power transmission wires extending through an inner portion of the belt and electrically connecting the first power source receiver to the power clip first portion through at least a portion of the first clip strap, a belt clip configured to secure the belt around a waist of a user; a trimmer comprising: a trimmer base comprising: a motor embedded within the trimmer base and configured to power the trimmer, a trimmer power source receiver, a shaft extending from a first distal end of the trimmer base, the shaft being adjustable in length, a debris shield secured proximate to a first end of the shaft, a trimmer head secured below the debris shield to the first end the shaft and electrically connected to the motor, a plurality of cutting swaths secured to the trimmer head, a first handle portion extending orthogonally from the shaft proximate to a shaft-trimmer base junction and comprising a trigger operative to actuate the motor, a second handle extending from the first handle and configured to axially rotate around the first handle, the second handle comprising a locking means configured to secure the second handle into a fixed position; and a power source configured to releasably secure to either the first power source receiver or the trimmer power source receiver and configured to provide electrical output to the trimmer, wherein the power source, when secured to the belt power source receiver and the power clip first portion is secured to the power clip second portion, is configured to provide electrical output to the motor of the trimmer, wherein the power source, when secured to the trimmer power source receiver, is configured to provide electrical output to the motor of the trimmer.

The present disclosure further provides a method for operating a weed trimmer apparatus, the method comprising: orienting a second handle of a trimmer such that the second handle is parallel to a shaft of the trimmer and extending toward a trimmer head of the trimmer; securing a power source to a trimmer base via a trimmer power source receiver; grasping a trimmer base cylindrical portion of the trimmer with a hand of a user; grasping a first handle of the trimmer with another hand of the user; and actuating a trigger, disposed on the first handle, by the hand of the user thereby supplying electrical power to a motor of the trimmer operatively connected to a trimmer head causing an axial rotation of the trimmer head having a plurality of cutting swatch secured thereto.

The present disclosure further provides a method for operating a weed trimmer apparatus, the method comprising: securing a handle brace to a portion of a second handle of a trimmer at a location operative to receive a forearm of a user; orienting the second handle parallel to a shaft of the trimmer and extending toward a trimmer base of the trimmer; securing a power source to the trimmer base via a trimmer power source receiver; securing the handle brace around a forearm of a user; grasping a first handle of the trimmer with a hand associated with the corresponding forearm of the user; and actuating a trigger, disposed on the first handle, by the hand of the user thereby supplying electrical power to a motor of the trimmer operatively connected to a trimmer head causing an axial rotation of the trimmer head having a plurality of cutting swatch secured thereto.

The present disclosure further provides a method for operating a weed trimmer apparatus, the method comprising: securing a belt around a user, the belt comprising: a first clip strap secured to an outer portion of the belt on one end and secured to a power clip first portion on another end, and a belt power source receiver; securing a power source to the belt power source receiver; securing a power clip second portion to power clip first portion, the power clip second portion being secured to the trimmer via a second clip strap; orienting a second handle of a trimmer such that the second handle extends orthogonally to a shaft of the trimmer and across a torso of a user; grasping a first handle of the trimmer with a hand of a user; grasping the second handle of the trimmer with another hand of a user; and actuating a trigger, disposed on the first handle, by the hand of the user thereby supplying electrical power to a motor of the trimmer operatively connected to a trimmer head causing an axial rotation of the trimmer head having a plurality of cutting swatch secured thereto.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIG. 713 further illustrates the power clip 300;

DETAILED DESCRIPTION

Figure 1:
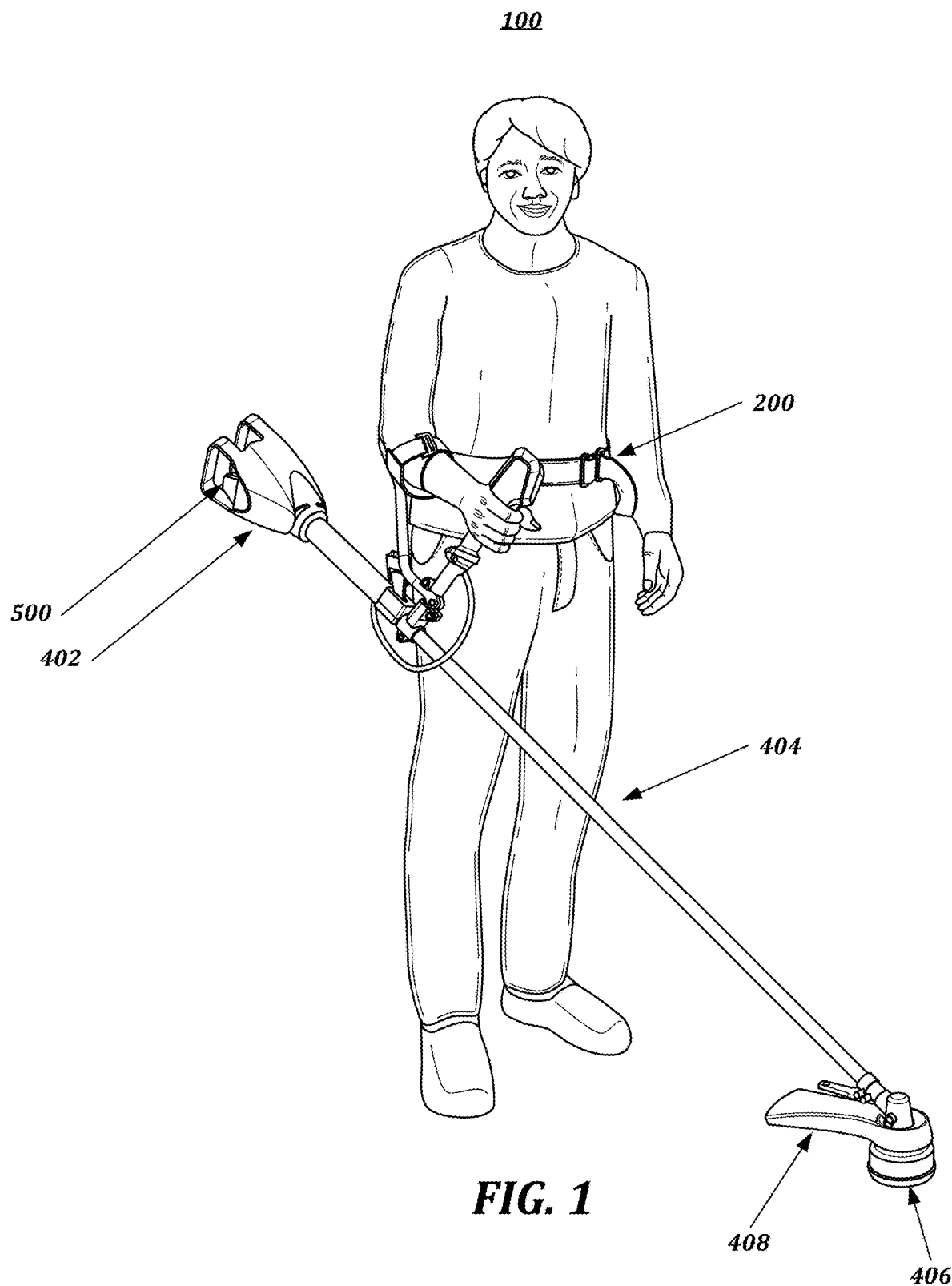
FIG. 1 illustrates a weed trimming apparatus 100 consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of modular power tools, landscaping, and ergonomic configurations, embodiments of the present disclosure are not limited to use only in this context.

I. Apparatus Overview

This overview is provided to introduce a selection of concepts in a simplified form that are further described below. This overview is not intended to identify key features or essential features of the claimed subject matter. Nor is this overview intended to be used to limit the claimed subject matter's scope.

A weed trimmer apparatus 100 may be provided. Some benefits of the apparatus 100 may be improved lower back health comfort, modularity, and overall configurability. Some unique features of the apparatus 100 may be split into two areas: The handle system and the belt system. The handle system may have a primary handle and a secondary handle. The primary handle may extend from a trimmer shaft and may be fixed in position. The primary handle's grip may contain the operating controls for the trimmer. The secondary handle may be attached to the primary handle and is operable to rotate around the primary handle in either direction, the secondary handle may have a clamping lever to lock them into a desired position. The belt system may have a padded hip belt, an adjustable squeeze buckle with webbing that can accommodate various waist sizes, and pockets for neatly storing excess webbing. A battery mount for attaching a battery may be wired to a buckle connector with the wiring running through the belt. The buckle connector may be attached to a buckle mount with webbing wires running through the webbing and buckle to an embedded five pin electrical connector. The buckle may comprise two spring loaded arms that lock into a main belt connector and the embedded five pin electrical connector may be configured to mate with a corresponding buckle in the main buckle connector operative to transmit power and information from the battery mount. The main buckle connector is located on the trimmer and may be electrically connected to the trimmer motor. One advantage of the buckle connector design is the quick and easy to use electrical attachment system capable of holding the weight of the trimmer while also creating electrical connections without putting stress on the electrical connections or wires. The handle system and apparatus 100 may have three possible configurations.

The first configuration may resemble a standard trimmer but with ergonomic improvement via the secondary handle positioned in line with the trimmer shaft and pointing down to the trimmer head. This position may be used to keep the secondary handle out of the way as it is not utilized in this first configuration. The user may hold the trimmer like a standard trimmer, but instead of needing to hunch over and reach across with a non-dominant hand, for a traditional trimmer handle, the user grabs the extended primary handle thereby allowing an upright stance. Additionally, the current embodiment allows for control operation with the user's non-dominant hand, differing from a standard trimmer. The current configuration may be equally well suited for right or left-handed operators.

The second handle configuration may be achieved by orienting the secondary handle pointed toward the motor housing and installing a forearm cuff and strap attachment. The secondary handle has numerous position options for mounting the forearm cuff to accommodate different forearm lengths. To use this configuration, the user may insert their arm into the forearm cuff and tighten the forearm strap, thereby locking the trimmer to the operator's arm. This configuration may allow for one arm use and may allow the operator to stand up straight while operating the apparatus 100. This configuration may be equally suited for right or left-handed arms.

The third handle configuration may be achieved by rotating the secondary handle to a 90 position and connecting the trimmer to the belt by pressing together the buckle connectors thereby engaging the locking arm and holding the weight of the trimmer. The apparatus 100, in the current embodiment, may have the option for connecting a battery pack to the belt, to the trimmer, or both. An alternate version of the current embodiment may not have a battery mount or wiring and only a mechanical means of connecting the trimmer. One advantage of the belt is the transferring of weight of the trimmer and battery directly to your hips rather than to your shoulders and spine for other shoulder chest harnesses and slings. The primary and secondary handles in conjunction with the belt may provide a comfortable and ergonomic way to operate the trimmer for extended periods of time with improved operative control. Similar to the other two configurations, this configuration may be equally well suited for right or left-handed operators. To use left-handed, rotate the secondary handle to the other 90 degree position and flip the belt so the buckle connector is located on a user's left side, The buckle may be configured to be centered vertically on the buckle connector mounting strap and can swing up and down at least 180 degrees.

Embodiments of the present disclosure may comprise methods, systems, and components comprising, but not limited to, at least one of the following:

A. A Belt 200;
B. A Power Clip 300;
C. A Trimmer 400;
D. One or More Power Sources 500; and In some embodiments, the present disclosure may provide an additional set of components for further facilitating the system. The additional set of components may comprise, but not be limited to:

E. One or More Securing Means 600.

Details with regards to each component is provided below. Although components are disclosed with specific functionality, it should be understood that functionality may be shared between components, with some functions split between components, while other functions duplicated by the components. Furthermore, the name of the component should not be construed as limiting upon the functionality of the component. Moreover, each stage disclosed within each component can be considered independently without the context of the other stages within the same component or different components. Each stage may contain language defined in other portions of this specifications. Each stage disclosed for one component may be mixed with the operational stages of another component. In the present disclosure, each stage can be claimed on its own and/or interchangeably with other stages of other components.

The following depicts an example of a method of a plurality of methods that may be performed by at least one of the aforementioned components. Various hardware components may be used at the various stages of operations disclosed with reference to each component. For example, although methods may be described to be performed by a single apparatus, it should be understood that, in some embodiments, different operations may be performed by different apparatuses in operating in conjunction with each other. For example, the weed trimmer apparatus and system 100 may be employed in the performance of some or all of the stages disclosed with regard to the methods. Similarly, one apparatus may be employed in the performance of some or all of the stages of the methods. As such, the apparatus may comprise at least one of the architectural components disclosed herein.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

Consistent with embodiments of the present disclosure, a method may be performed by at least one of the aforementioned components. The method may be embodied as, for example, but not limited to, computer instructions, which when executed, perform the method. The method may comprise the following stages:

securing a belt around a user, the belt comprising:
        a first clip strap secured to an outer portion of the belt on one end and secured to a power clip first portion on another end, and
        a belt power source receiver;
    securing a power source to the belt power source receiver;
    securing a power clip second portion to power clip first portion, the power clip second portion being secured to the trimmer via a second clip strap;
    orienting a second handle of a trimmer such that the second handle extends orthogonally to a shaft of the trimmer and across a torso of a user;
    grasping a first handle of the trimmer with a hand of a user;
    grasping the second handle of the trimmer with another hand of a user; and
    actuating a trigger, disposed on the first handle, by the hand of the user thereby supplying electrical power to a motor of the trimmer operatively connected to a trimmer head causing an axial rotation of the trimmer head having a plurality of cutting swatch secured thereto.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and sub-combinations described in the detailed description.

II. System Configuration

Embodiments of the present disclosure provide a weed trimmer apparatus and system 100 comprised of a distributed set of components, including, but not limited to:

A. Belt 200

At least FIGS. 1-12 illustrate the belt 200 consistent with an embodiment of the disclosure. The belt 200 may be used to secure around a user's waist. The belt 200 may be further used to secure to and/or receive the trimmer 400. In some embodiments, the belt 200 may comprise padding configured to provide comfort and/or stability between a user's waist and the belt 200. In further embodiments, the belt 200 may comprise a rigid and/or semirigid portion spanning a portion (e.g., a user's lower back area) of an inner side of the belt operative for, for example, lumbar support.

Figure 12:
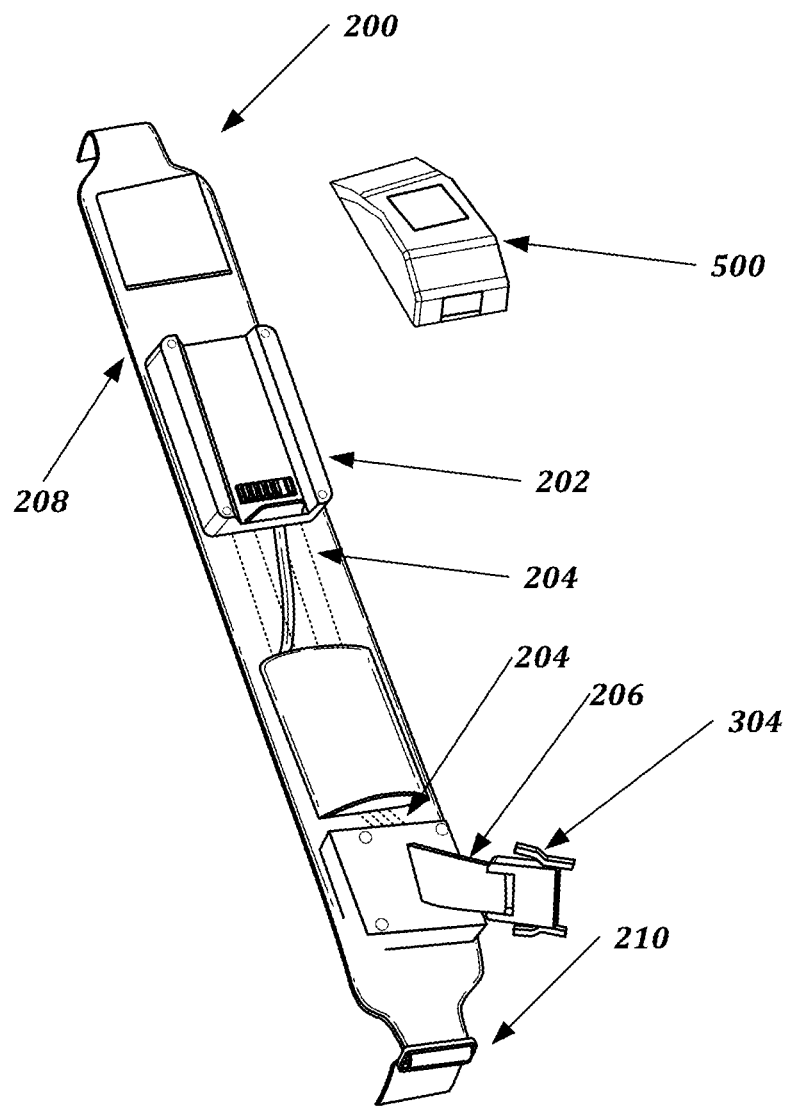
FIG. 12 illustrates a belt 200 and one of the one or more power sources 500.
Figure 13:
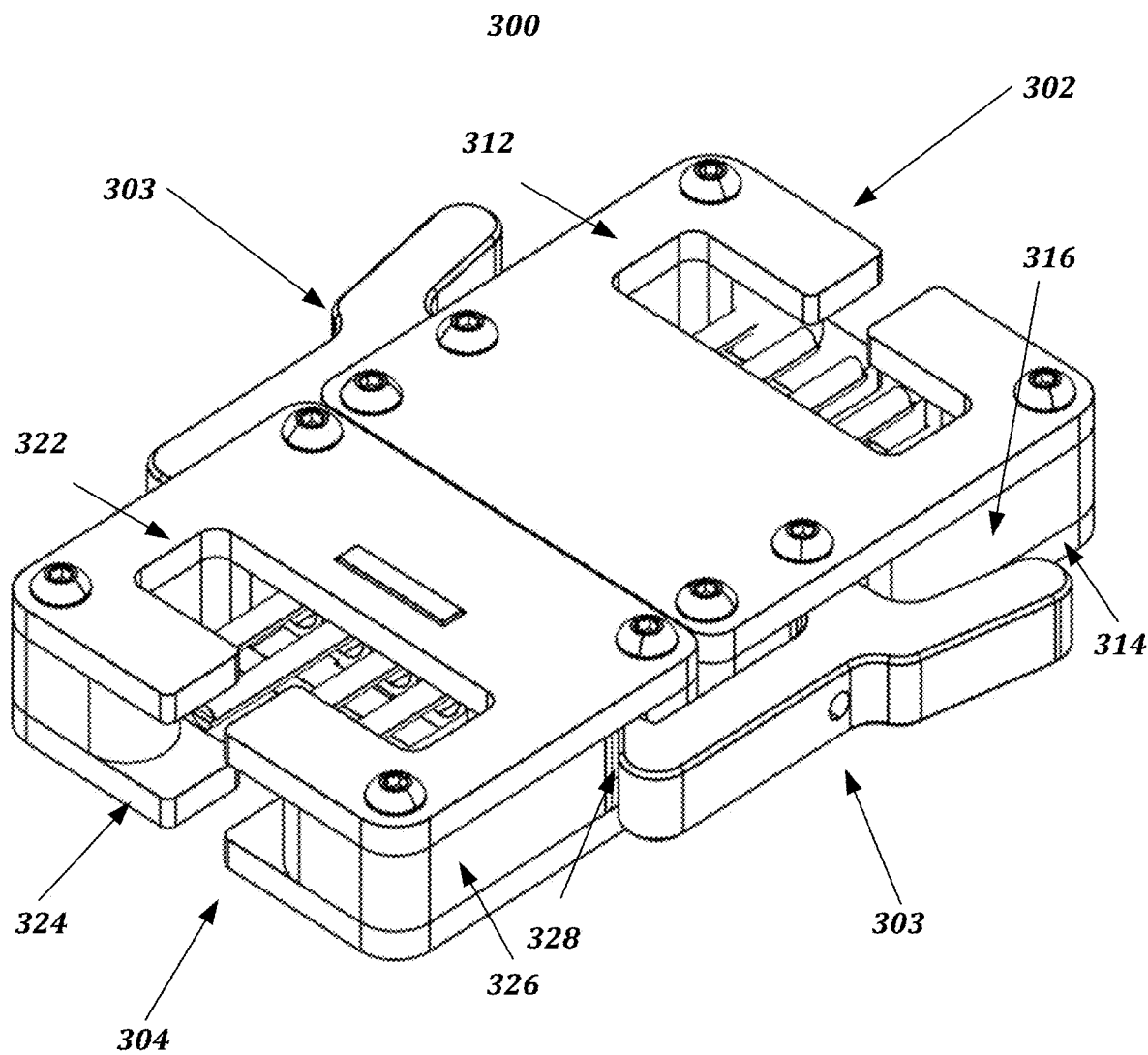
FIG. 13 further illustrates the power clip 300.
Figure 14:
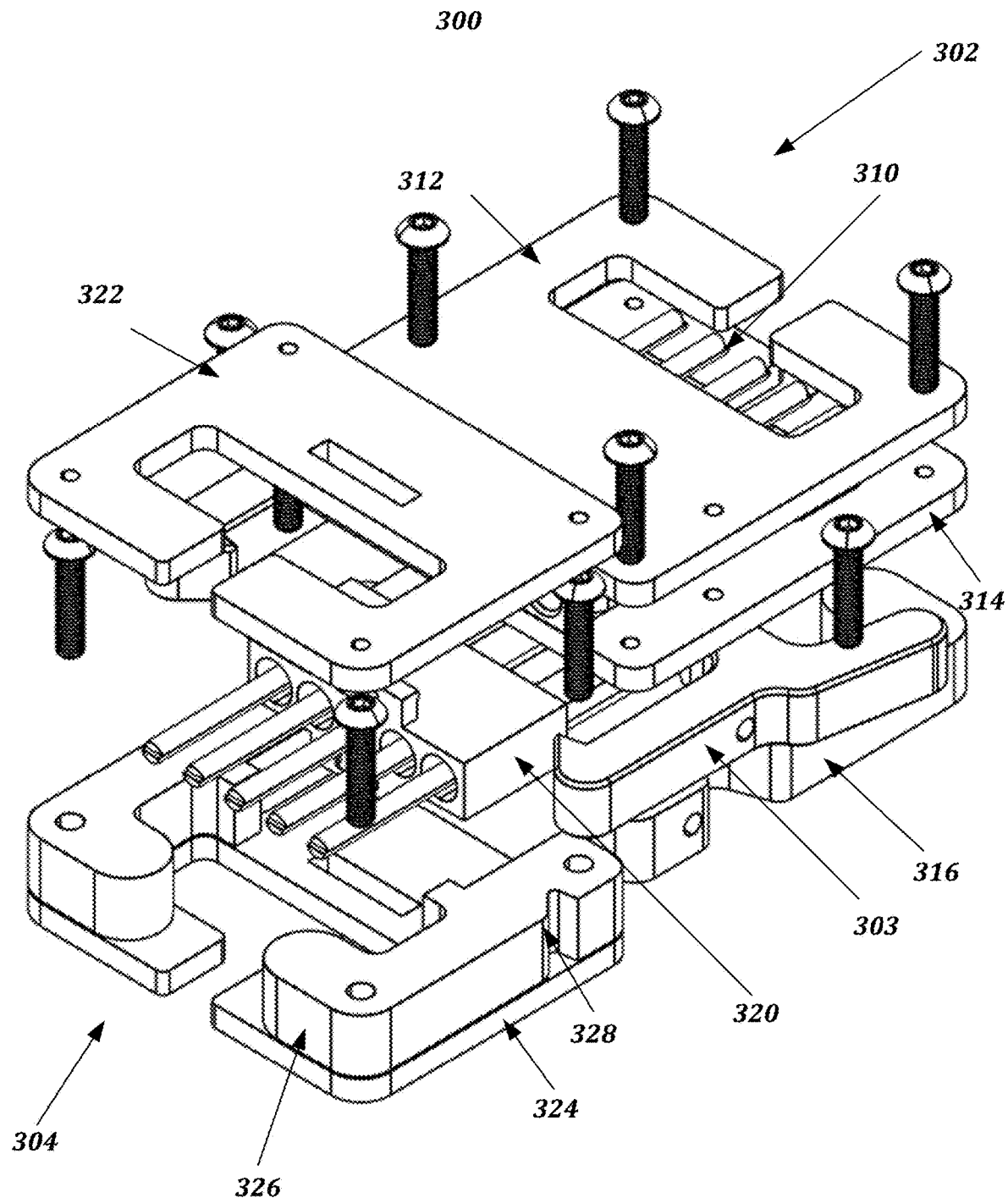
FIG. 14 further illustrates the power clip 300.
Figure 15:
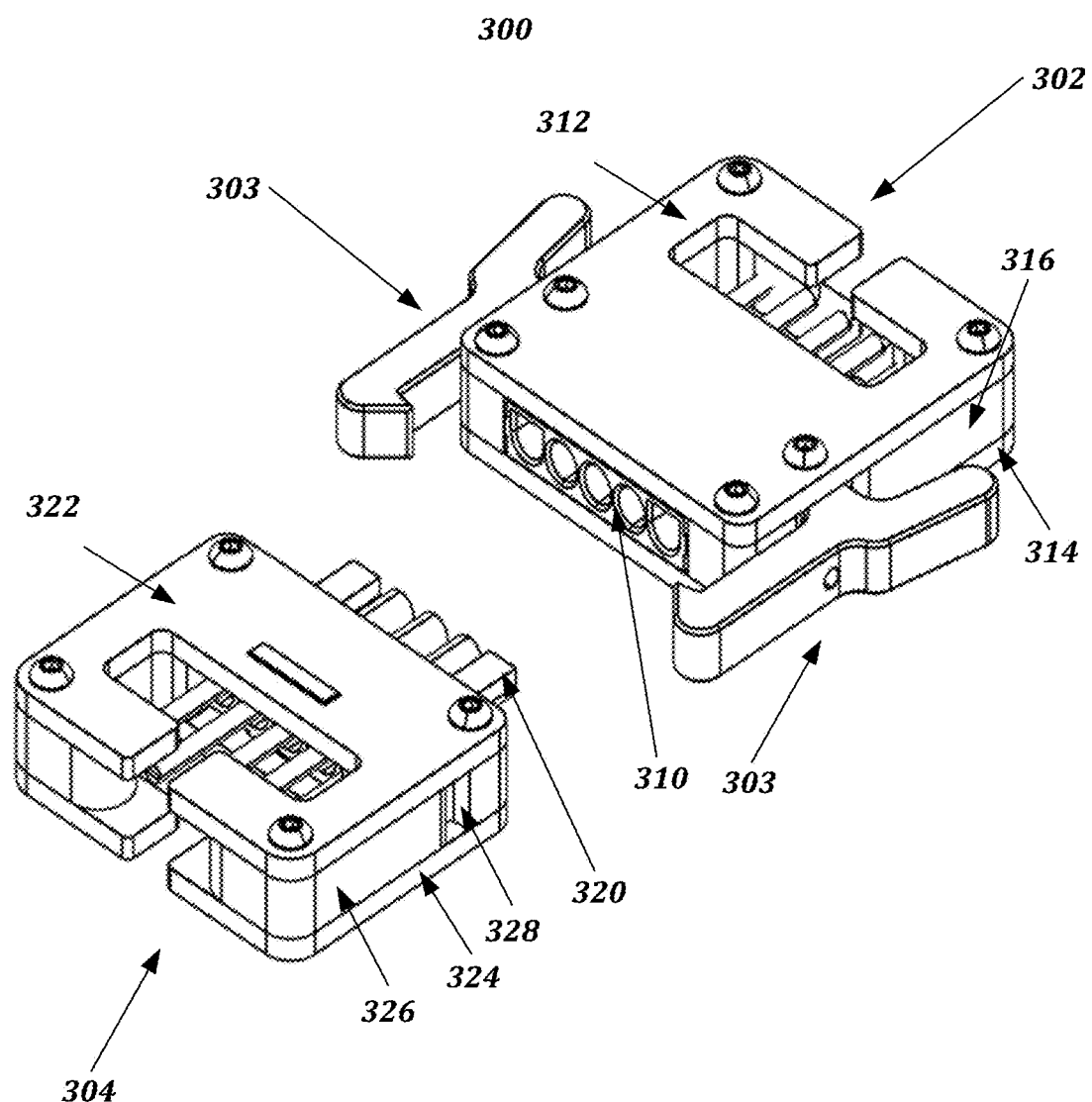
FIG. 15 further illustrates the power clip 300.
Figure 16:
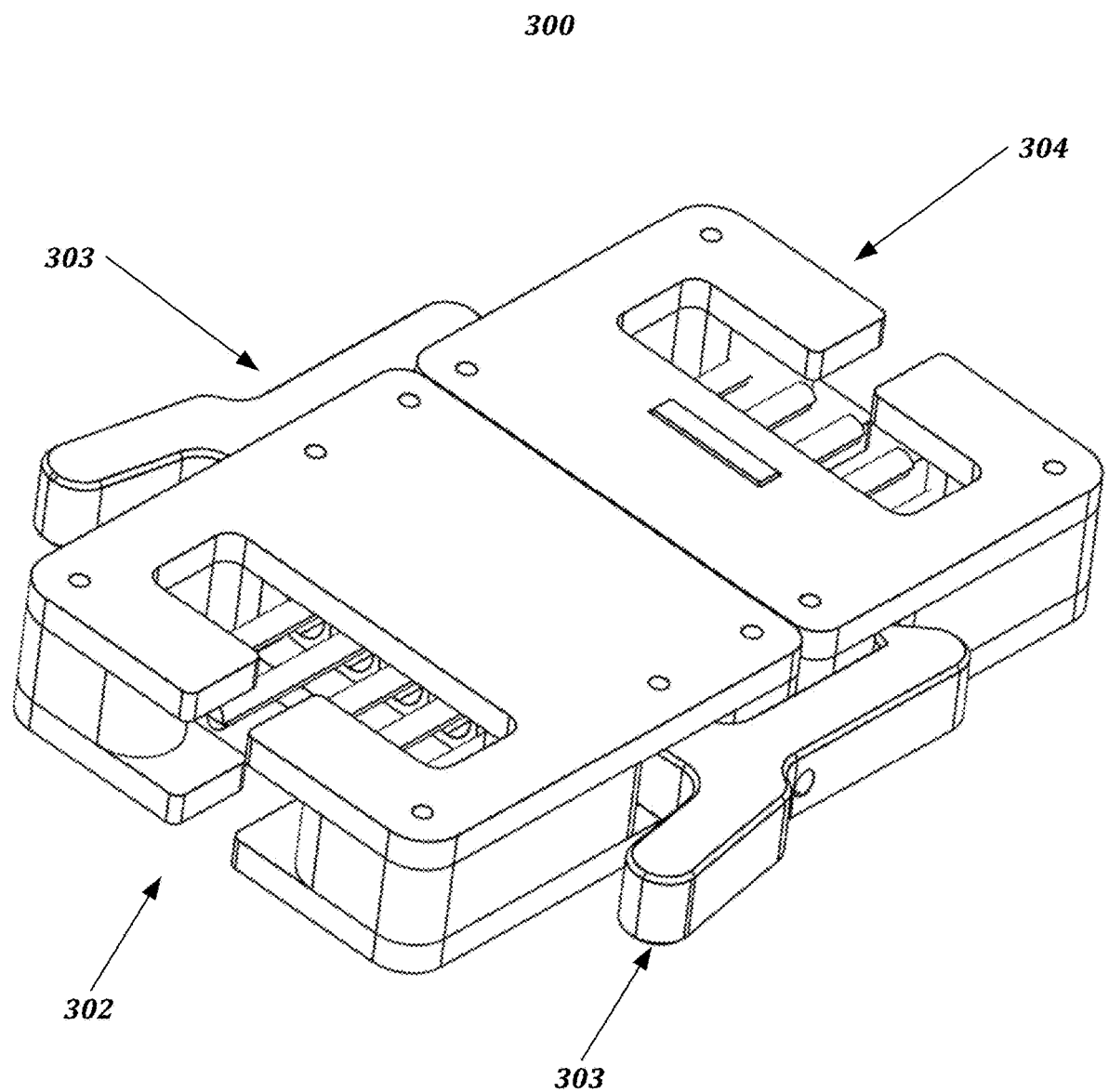
FIG. 16 further illustrates the power clip 300.
Figure 17:
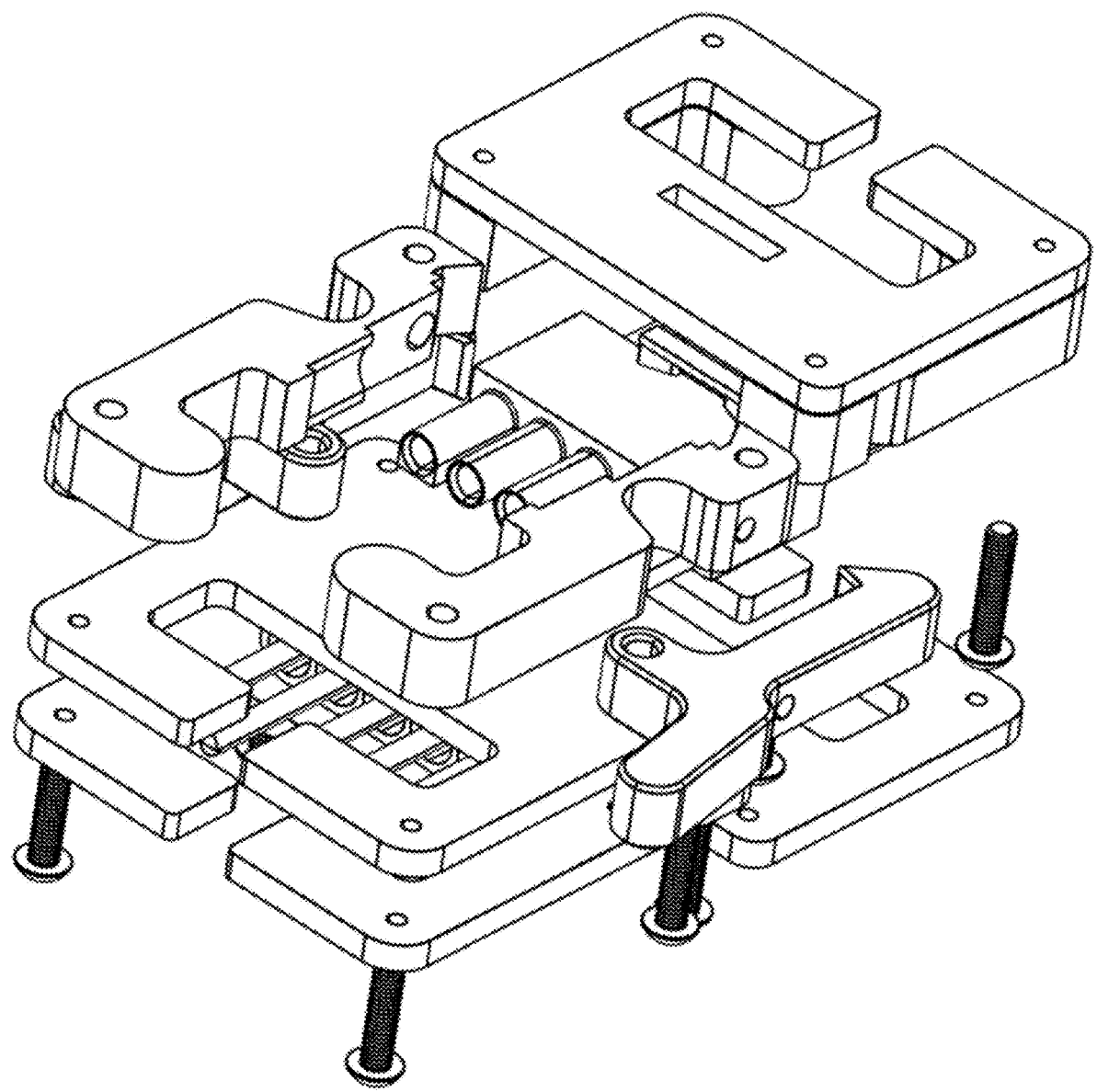
FIG. 17 further illustrates the power clip 300.
Figure 18:
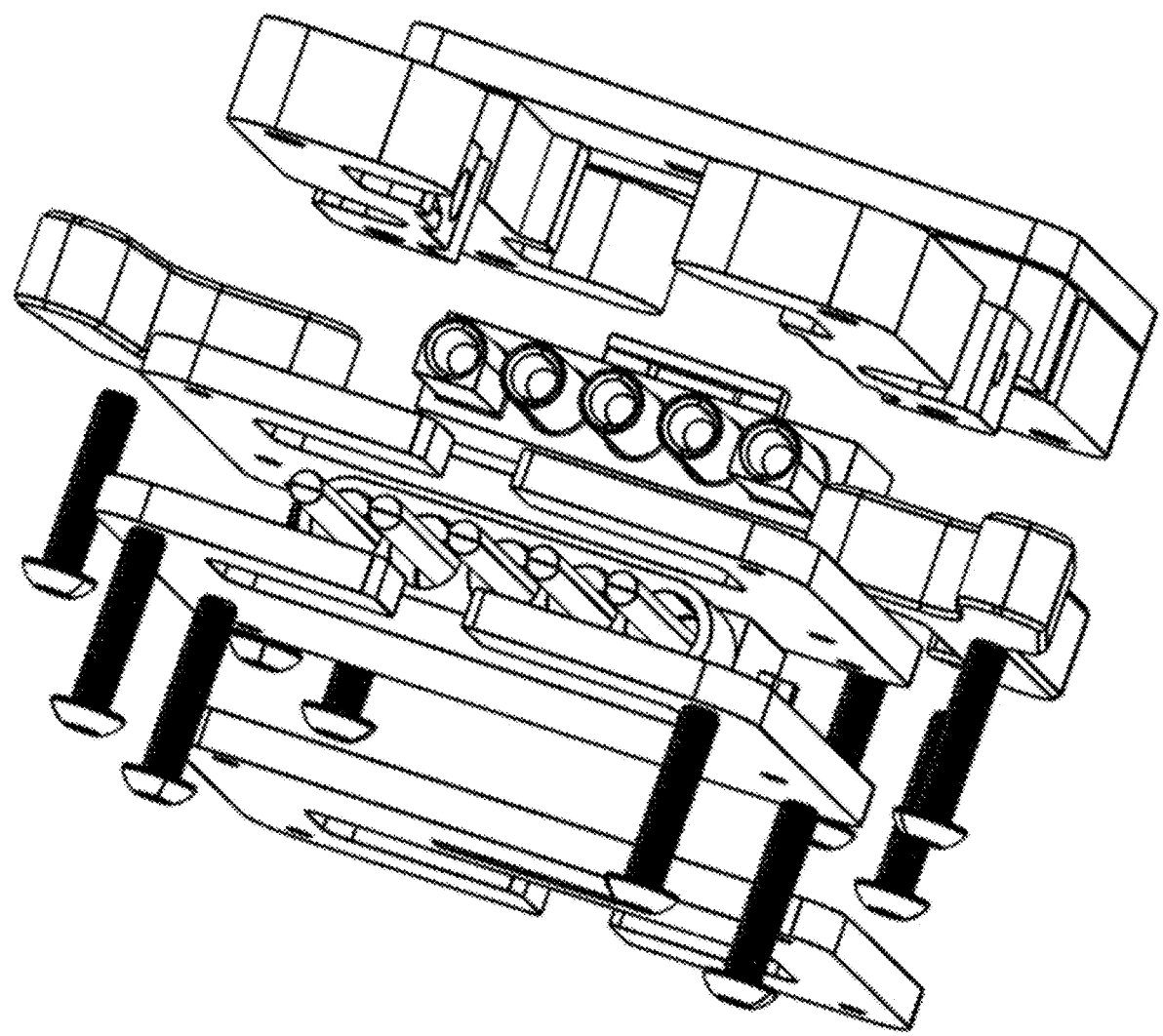
FIG. 18 further illustrates the power clip 300.
Figure 19A:
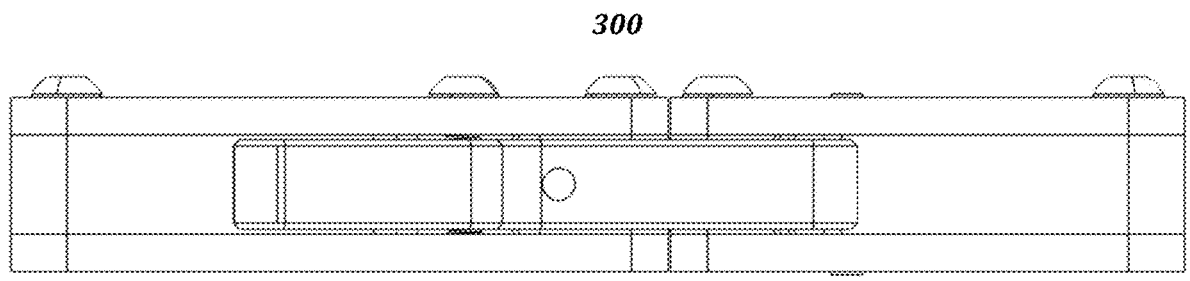
FIG. 19A further illustrates the power clip 300.
Figure 19B:
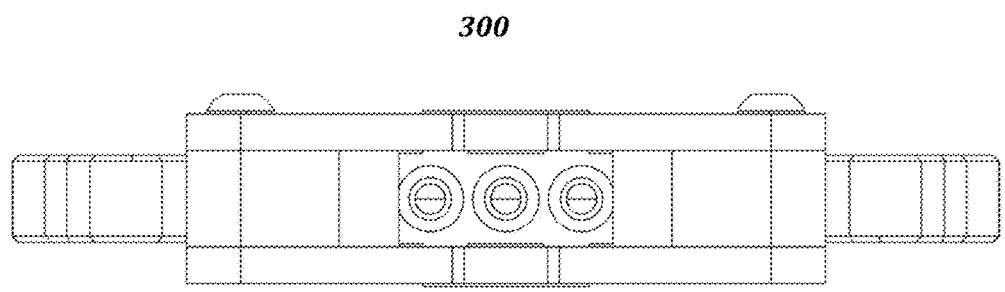
FIG. 19B further illustrates the power clip 300.
Figure 19C:
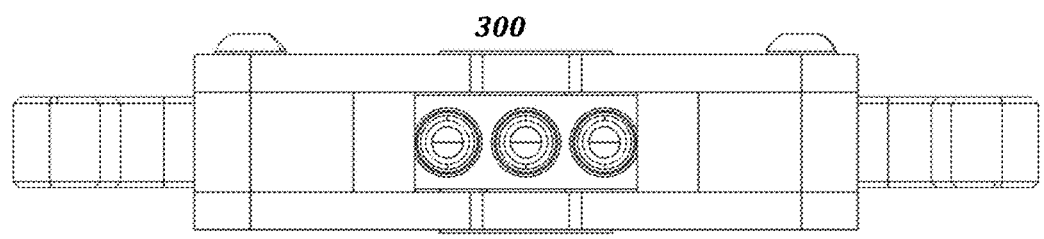
FIG. 19C further illustrates the power clip 300.

In further embodiments, the belt 200 may comprise a belt power source receiver 202, illustrated in at least FIG. 12. The belt power source receiver 202 may be used to electrically receive at least a portion of the one or more power sources 500. The belt power source receiver 202 may be disposed on an outer portion of the belt 200. In some embodiments, the belt power source receiver 202 may be oriented proximate to a hip of a user.

In further embodiments, the belt 200 may comprise a plurality of power transmission wires 204, illustrated in at least FIG. 12. The plurality of power transmission wires 204 may be used to electrically connect the belt power source receiver 202 to a power clip first portion 302. The plurality of power transmission wires 204 may be configured to embed within the belt 200. By way of nonlimiting example, the plurality of transmission wires 204 may be embedded in the belt 200 via, webbing, mesh, and/or in between two layers of the belt 200. In some embodiments, the plurality of power transmission wires 204 may span at least a portion of the length of the belt 200.

In further embodiments, the belt 200 may comprise a first clip strap 206, illustrated in at least FIG. 12. The first clip strap 206 may be used to secure the power clip first portion 302 to the belt 200. The first clip strap 206 may be made from a flexible yet strong material capable of being torqued, rotated, and/or pulled while under tension. In some embodiments, the first clip strap 206 may be disposed on an outer portion of the belt 200. The first clip strap 206 may be disposed substantially opposite to the belt power source receiver 202. In further embodiments, the first clip strap 206 may be configured to house at least a portion of the plurality of power transmission wires 204. In other embodiments, the first clip strap 206 may be configured to house a plurality of secondary power transmission wires (not shown).

In further embodiments, the belt 200 may comprise padding 208, illustrated in at least FIG. 12. The padding 208 may be used to provide comfort to the and/or belt stability when the belt 200 is mounted on a user.

In further embodiments, the belt 200 may comprise a belt clip 210, illustrated in at least FIG. 12. The belt clip 208 may be used to secure distal ends of the belt 200 to one another and/or to secure the belt 200 around the user's waist. The belt clip 210 may comprise one or more integral straps for length (and/or waist size) adjustment of the belt 200.

B. Power Clip 300

At least FIGS. 1-19 illustrate the power clip (and/or buckle) 300 consistent with an embodiment of the disclosure. The power clip 300 may be used to electrically connect the trimmer 400 to the belt 200 (e.g., use a power source 500 secured to the power source receiver 202 to transmit electrical power to the trimmer 400) without exerting excess stress on the electrical connections and/or wires within the power clip 300 and/or wires connected thereto. The power clip 300 may be further used to connect the trimmer 400 to the belt 200 operative to distribute the weight of the trimmer 400 onto the belt 200.

In some embodiments, the power clip 300 may comprise the power clip first portion 302, illustrated in at least FIGS. 1-19. The power clip first portion 302 may be used as a portion of the power clip 300 to bidirectionally transmit electrical power from a power clip second portion 304 to the portion of the plurality of power transmission wires 204 integrated into the clip strap 206. As shown in at least FIGS. 14 and 15, at least a portion of the power clip first portion 302 may be embodied as, but not limited to, a five-pin electrical connector 310. The five-pin electrical connector 310 in one embodiment, may be embodied with a male insertion portion. The five-pin electrical connector 310 in another embodiment, may be embodied with a female insertion portion having a plurality of cylinders, apertures and other friction and connection points thereby allowing electrical connectivity. In some embodiments the power clip first portion 302 may comprise one or more tension loaded (e.g., spring loaded) arms 303 configured to secure to divots 328 disposed in a side housing 326 of the power clip second portion 304. The power clip first portion 302 may include a top housing plate 312 and a bottom housing plate 314 that are securely fastened together by appropriate securing means. The top and bottom housing plates 312, 314 may be designed to protect the internal components of the power clip first portion 302 (e.g., the electrical connector 310) from external elements, ensuring reliable operation in various conditions. The power clip first portion 302 may further include side housings 316 that provide additional protection and stability to the power clip 300. These side housings 316 may be robustly constructed to withstand the rigors of regular use. The top housing plate 312, bottom housing plate 314, and side housings 316 may surround at least a portion of the electrical connector 310.

In some embodiments, the power clip 300 may comprise the power clip second portion 304, illustrated in at least FIGS. 1-19. The power clip second portion 304 may be used as a portion of the power clip 300 to bidirectionally transmit electrical power from a plurality of trimmer transmission wires 424 integrated into a trimmer clip strap 422 to the power clip first portion 302. As shown in at least FIGS. 14 and 15, at least a portion of the power clip second portion 304 may be embodied as, but not limited to, another five-pin electrical connector 320. The other five-pin electrical connector 320 in one embodiment, may be embodied with a male insertion portion. The other five-pin electrical connector 320, in another embodiment, may be embodied with a female insertion portion having a plurality of cylinders, apertures and other friction and connection points thereby allowing electrical connectivity when in contact with the five-pin electrical connector of the power clip first portion 304. The power clip second portion 304 may include a top housing plate 322 and a bottom housing plate 324 that are securely fastened together by appropriate securing means. The top and bottom housing plates 322, 324 may be designed to protect the internal components of the power clip second portion 304 (e.g., the electrical connector 320) from external elements, ensuring reliable operation in various conditions. The power clip second portion 302 may further include side housings 326 that provide additional protection and stability to the power clip 300. These side housings may be robustly constructed to withstand the rigors of regular use. The top housing plate 322, bottom housing plate 324, and side housings 326 may surround at least a portion of the electrical connector 320. The physical connection between the power clip first portion 302 and the power clip second portion 304 (e.g., as secured by the tension arms 303 and the divots 328) forms a securing connector that allows the power clip 300 to support the weight of the trimmer without putting undue stress on the electrical connections (e.g., electrical connectors 310, 320) and/or wires.

C. Trimmer 400

At least FIGS. 1-11B illustrate the trimmer 400 consistent with an embodiment of the disclosure. The trimmer 400 may be used to cut, shred and/or trim grass, debris, and/or any other suitable medium.

In some embodiments, the trimmer 400 may comprise a trimmer base 402, illustrated in at least FIGS. 1-11B. The trimmer base 402 may be used to house a plurality of components of the trimmer 400 (e.g., wiring, motor(s), sensors, gears, shaft(s), circuitry, computing elements, and/or other suitable components). In some embodiments, the trimmer base 402 may comprise a trimmer base cylindrical portion 403 operative to be gripped by a hand of a user. The trimmer base cylindrical portion 403 may comprise padding, a grip-like material, and/or friction enhancing material to facilitate gripping and handling the trimmer 400 by the user.

In further embodiments, the trimmer 400 may comprise a shaft 404, illustrated in at least FIGS. 1-11B. The shaft 404 may be used to house a plurality of elements operative to electrically connect the motor to a trimmer head 406. A first distal end of the shaft 404 may secure to a portion of the trimmer base 402. A first distal end of the shaft 404 may secure to a portion of the trimmer head 406. In some embodiments, the shaft 404 may be adjustable in length.

In further embodiments, the trimmer 400 may comprise the trimmer head 406, illustrated in at least FIGS. 8-11B. The trimmer head 406 may be used to receive and/or house one or more cutting and/or trimming elements and/or cutting swaths. The trimmer head 406 may axially rotate operative to a user's control.

In still further embodiments, the trimmer 400 may comprise a debris shield 408, illustrated in at least FIGS. 8-11B. The debris shield 408 may be disposed above the trimmer head 406 operative to inhibit particles, clippings, and/or other debris made airborne during a cutting operation of the trimmer 400 from being propelled in the general direction of the user of the trimmer 400.

In even further embodiments, the trimmer 400 may comprise a first handle 410, illustrated in at least FIGS. 1-11B.

The first handle 410 may be used to controllably operate and/or move the trimmer 400 by the user. The first handle 410 may extend orthogonally from the shaft proximate to the first distal end of the shaft 404. The first handle 410 may be a predetermined length as to allow the dominant hand of a user to grasp with minimal back curvature or forward leaning resultant from operation of the trimmer 400. In some nonlimiting embodiments, the first handle 410 may be adjustable in length and/or foldable. In some embodiments, the first handle 410 may comprise a grip portion operative to receive a user's hand. In other embodiments, the first handle 410 may comprise an upper grip portion and/or a lower grip portion. A handle protrusion 412 extending orthogonally from the first handle 410 may be disposed between the upper grip and the lower grip. The handle protrusion 412 may be used to ergonomically assist the hand and/or grip of the user when operating the trimmer 400. The upper grip portion may comprise a trigger 414. The trigger 414 may be used to actuate the trimmer 400. In some embodiments, the trigger 414 may be electrically connected to the motor. In further embodiments the trigger 414 may comprise one or more safety triggers operative to require physical depression (e.g., of a user's palm when holding the first handle 410) to allow actuation of the trimmer 400. The user may be enabled to grip an area between the first handle 410 and the trimmer base 402 in some embodiments.

In yet further embodiments, the first handle 410 may comprise a second handle 416, illustrated in at least FIGS. 1-11B. The second handle 416 may be used to ergonomically assist operative motion of the trimmer 400 by the user. In some nonlimiting embodiments the second handle 416 may be adjustable in length and/or foldable. The second handle 416 may be shaped in a variety of ways such as, but limited to, angular segments conformed to provide ergonomic comfort to a user's hand/forearm when secured thereto. The second handle may extend from, and rotatably secure to, the first handle 410 at a location between the lower grip portion and the connection point of the first handle 410 to the shaft 404. In some embodiments, the second handle 416 may be configured to axially rotate around the first handle 410. Though the second handle 416 may be secured around the first handle 410 in any number of positions, the second handle may have three preferential positions:
  a. parallel to the shaft 404 and extending toward the trimmer base 402,
  b. parallel to the shaft 404 and extending toward the trimmer head 406 and debris shield 408, and
  c. orthogonal to the shaft 404 and extending parallel to a user's torso.

Figure 2:
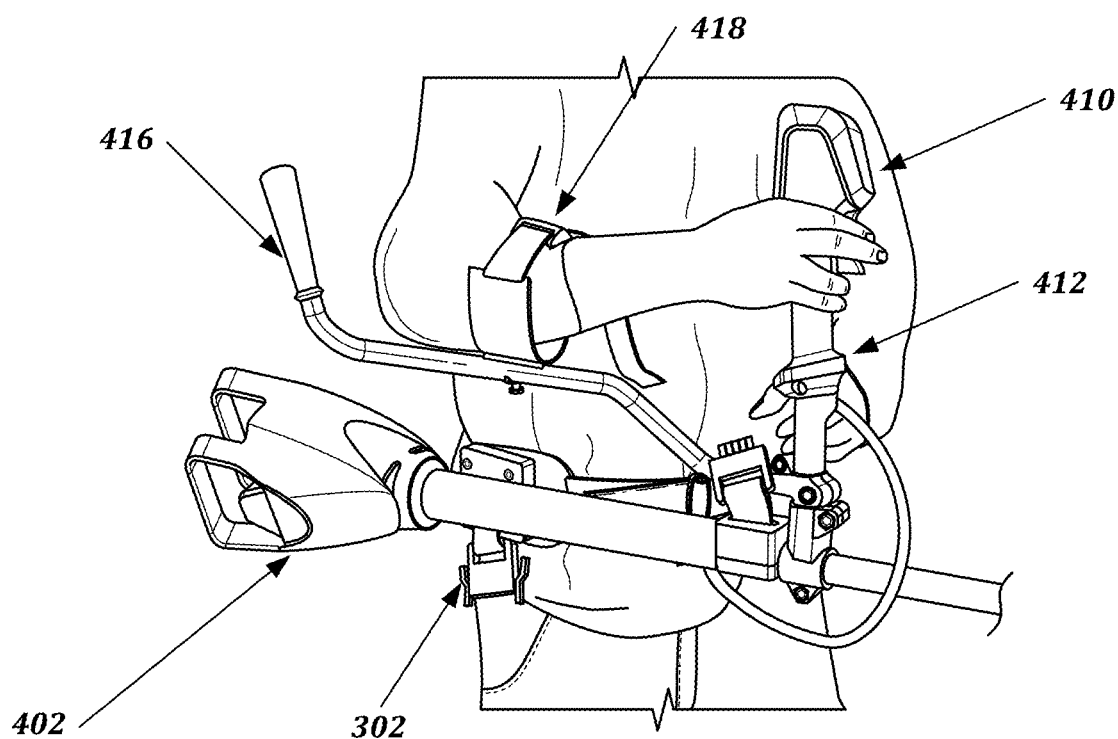
FIG. 2 illustrates the weed trimming apparatus 100 in a first configuration.
Figure 3:
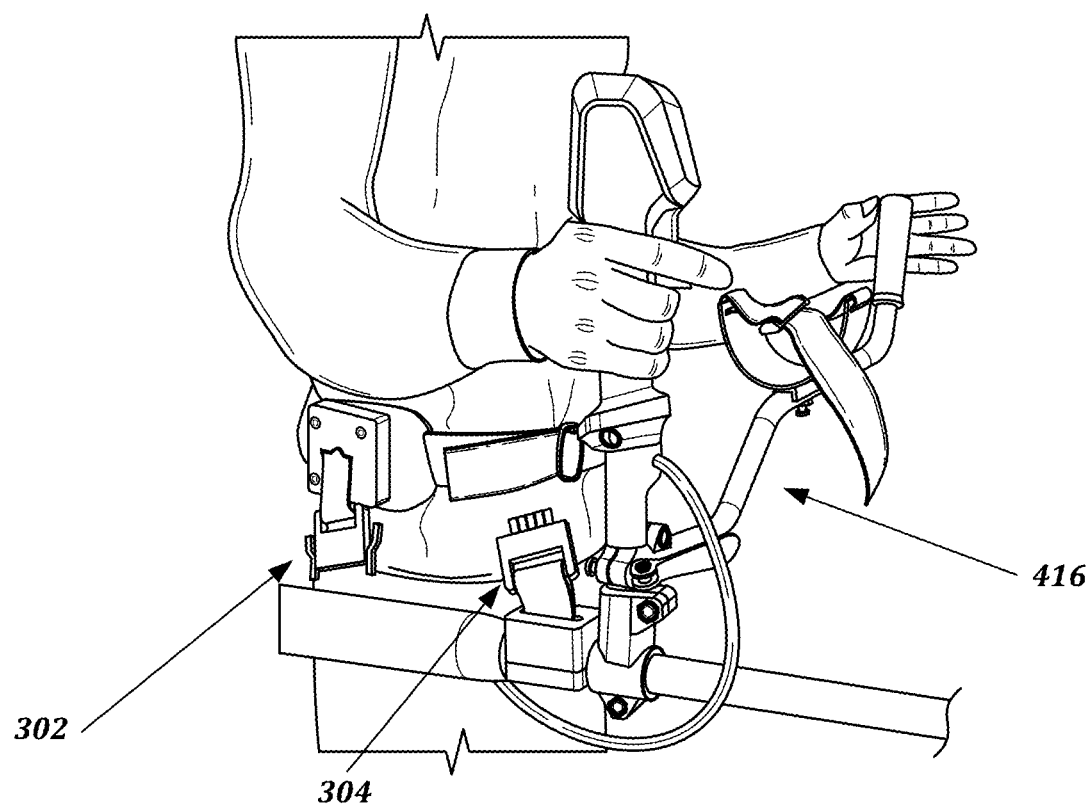
FIG. 3 illustrates the weed trimming apparatus 100 in second configuration.
Figure 4:
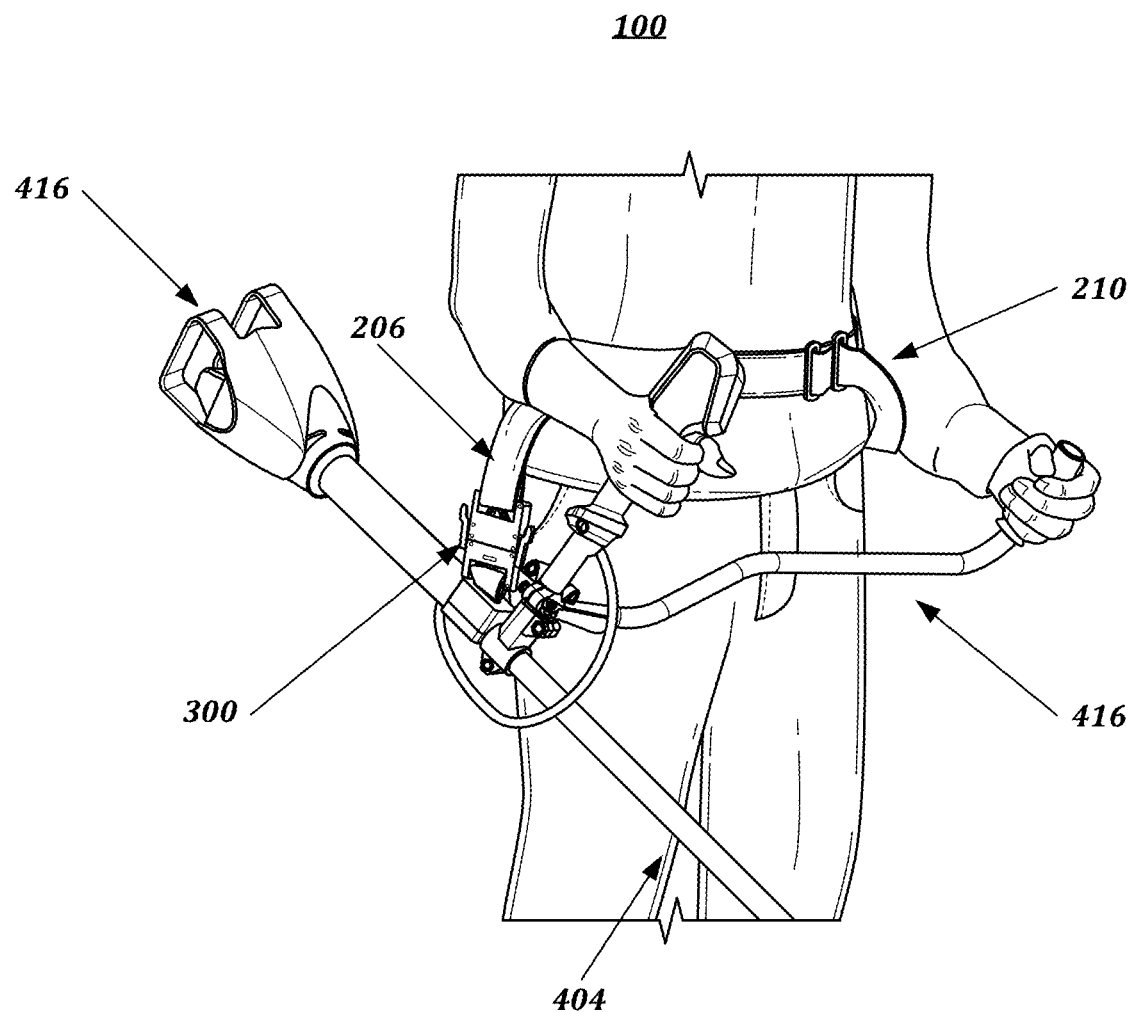
FIG. 4 further illustrates the weed trimming apparatus 100.
Figure 5:
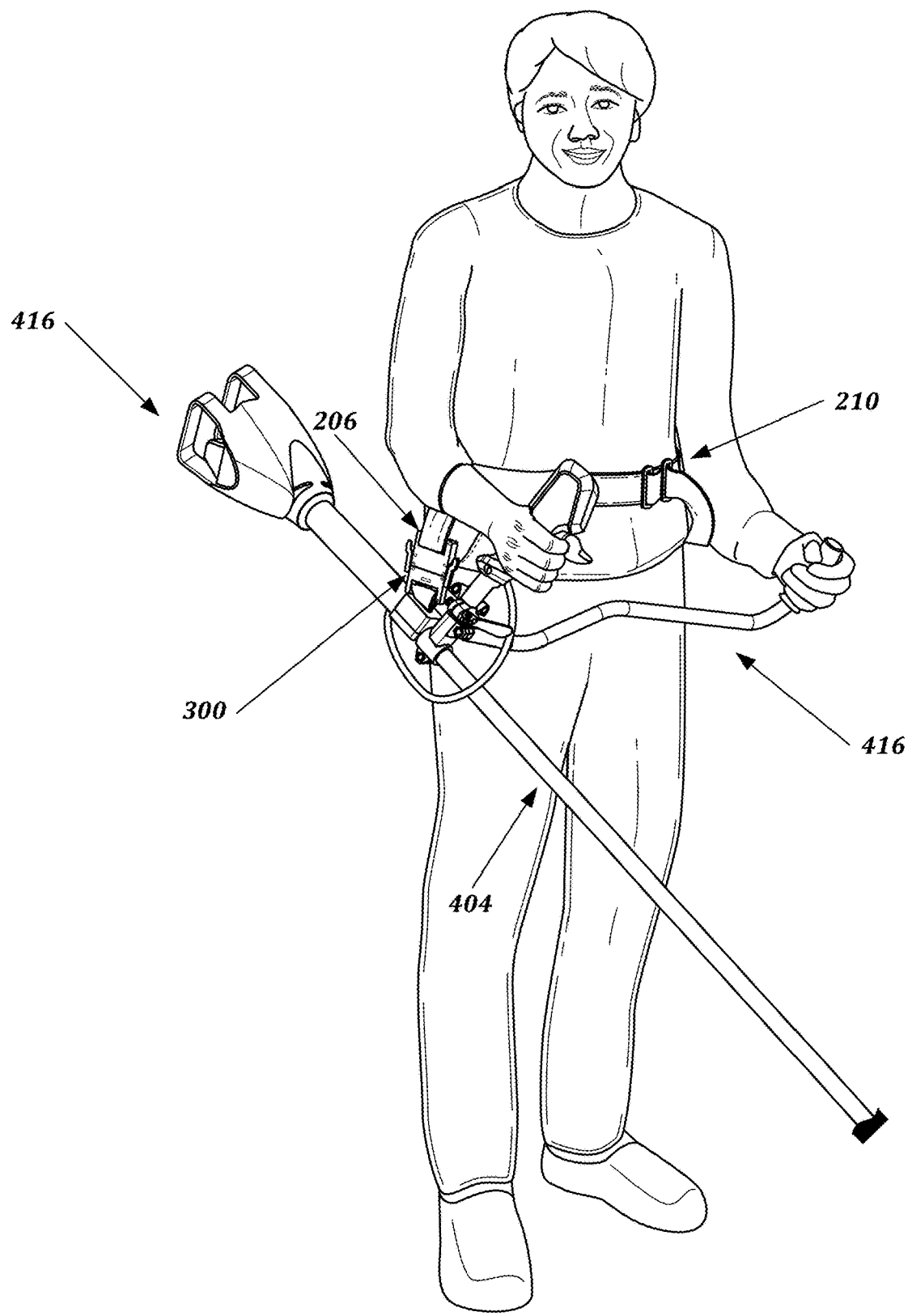
FIG. 5 further illustrates the weed trimming apparatus 100.
Figure 6:
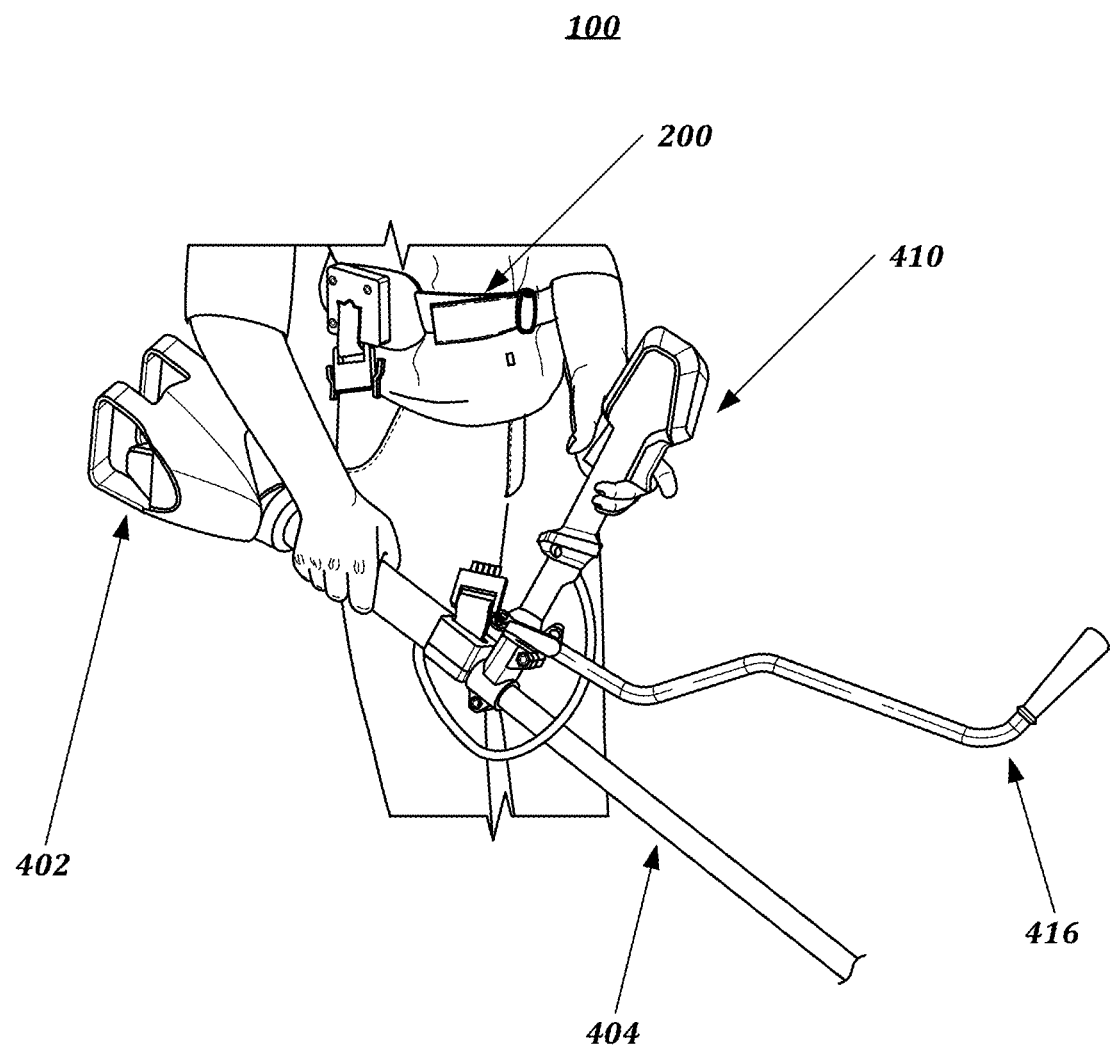
FIG. 6 further illustrates the weed trimming apparatus 100 in a third configuration.
Figure 7A:
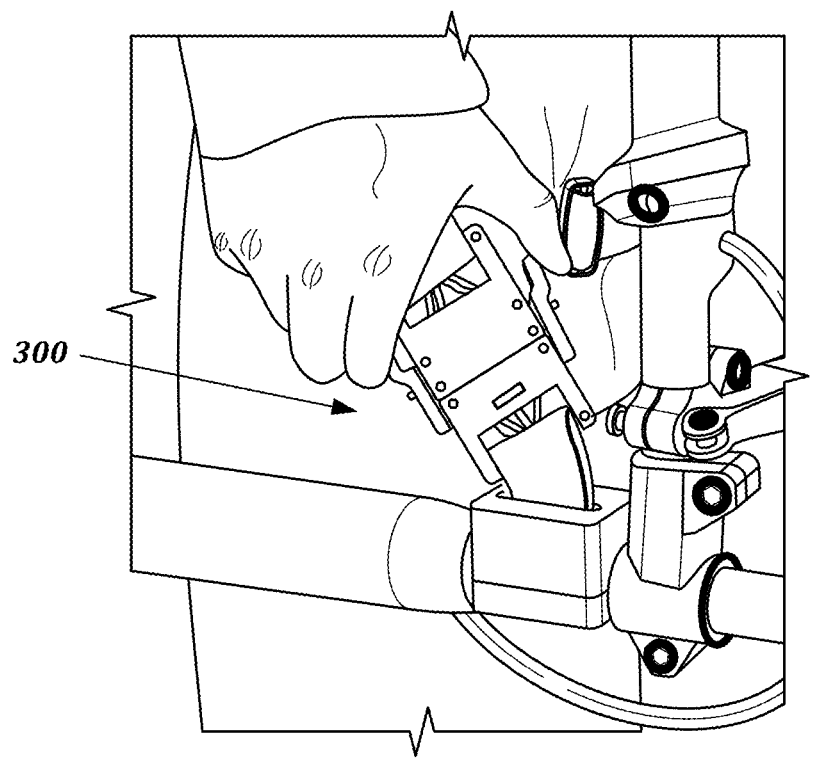
FIG. 7A illustrates a power clip 300.
Figure 7B:
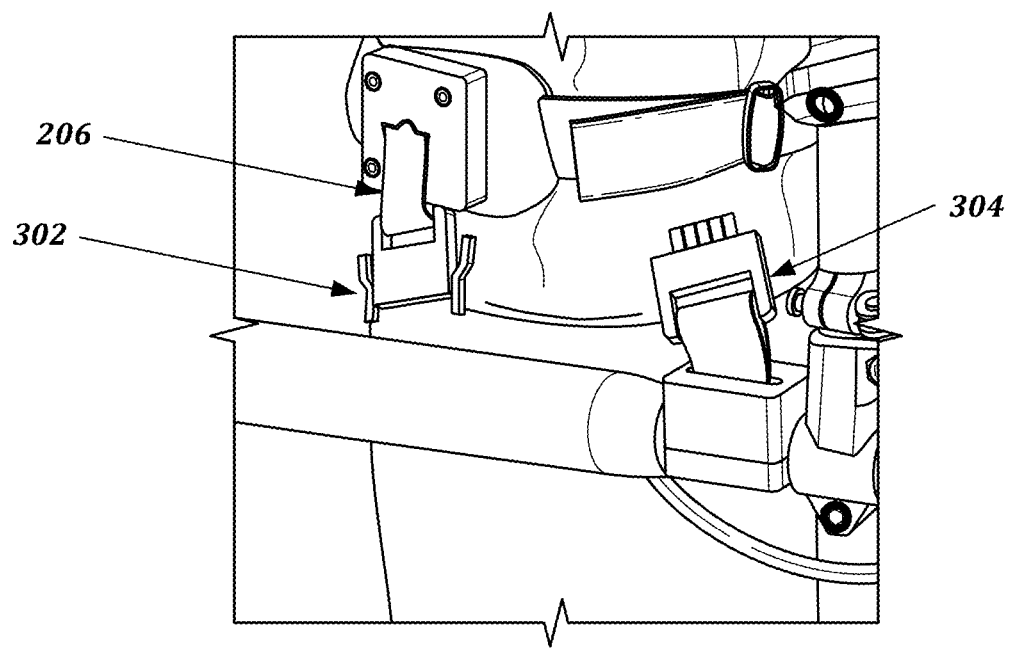
Figure 8:
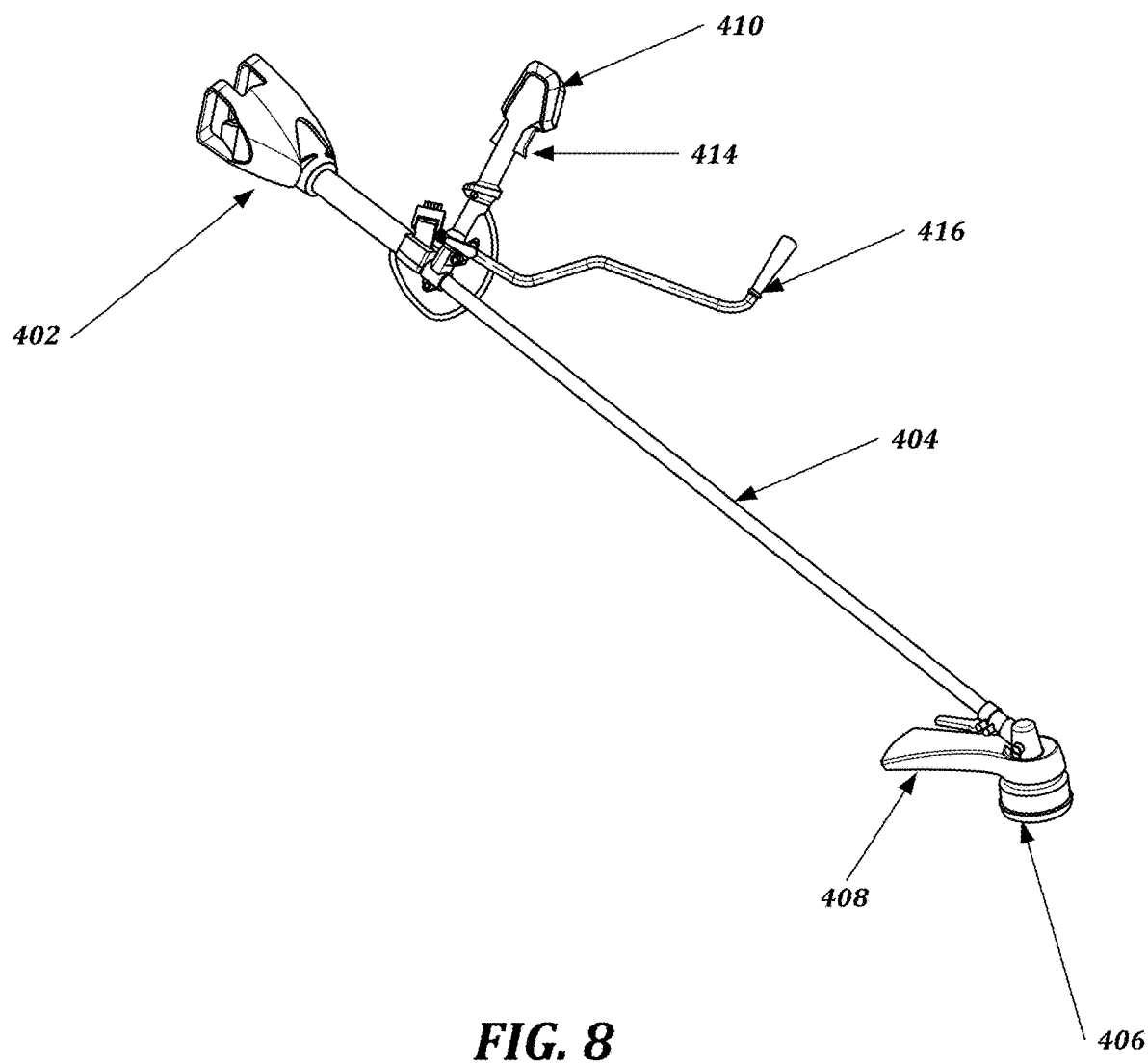
FIG. 8 further illustrates the weed trimming apparatus 100 in the third configuration.
Figure 9:
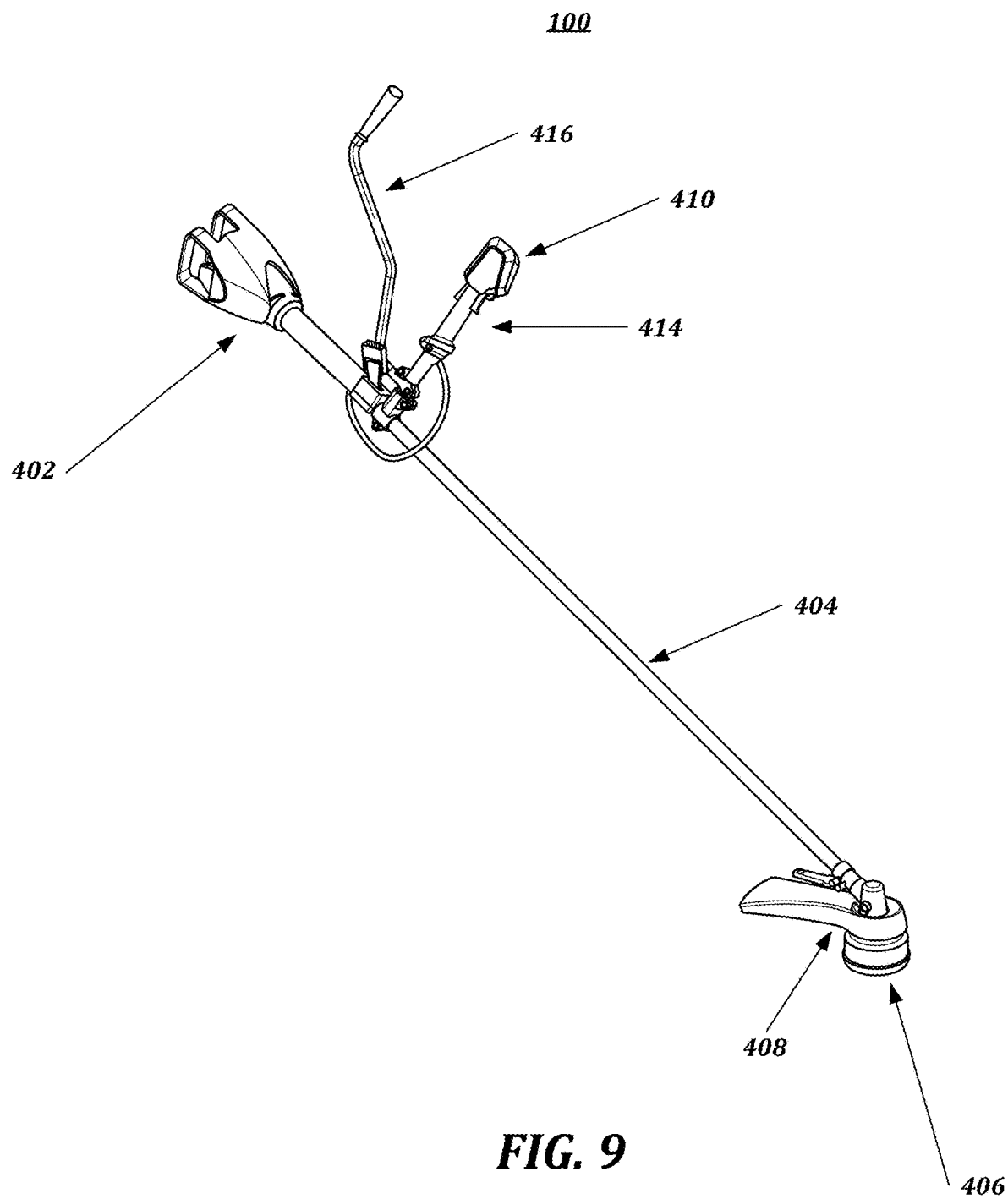
FIG. 9 further illustrates the weed trimming apparatus 100 in the first configuration.
Figure 10:
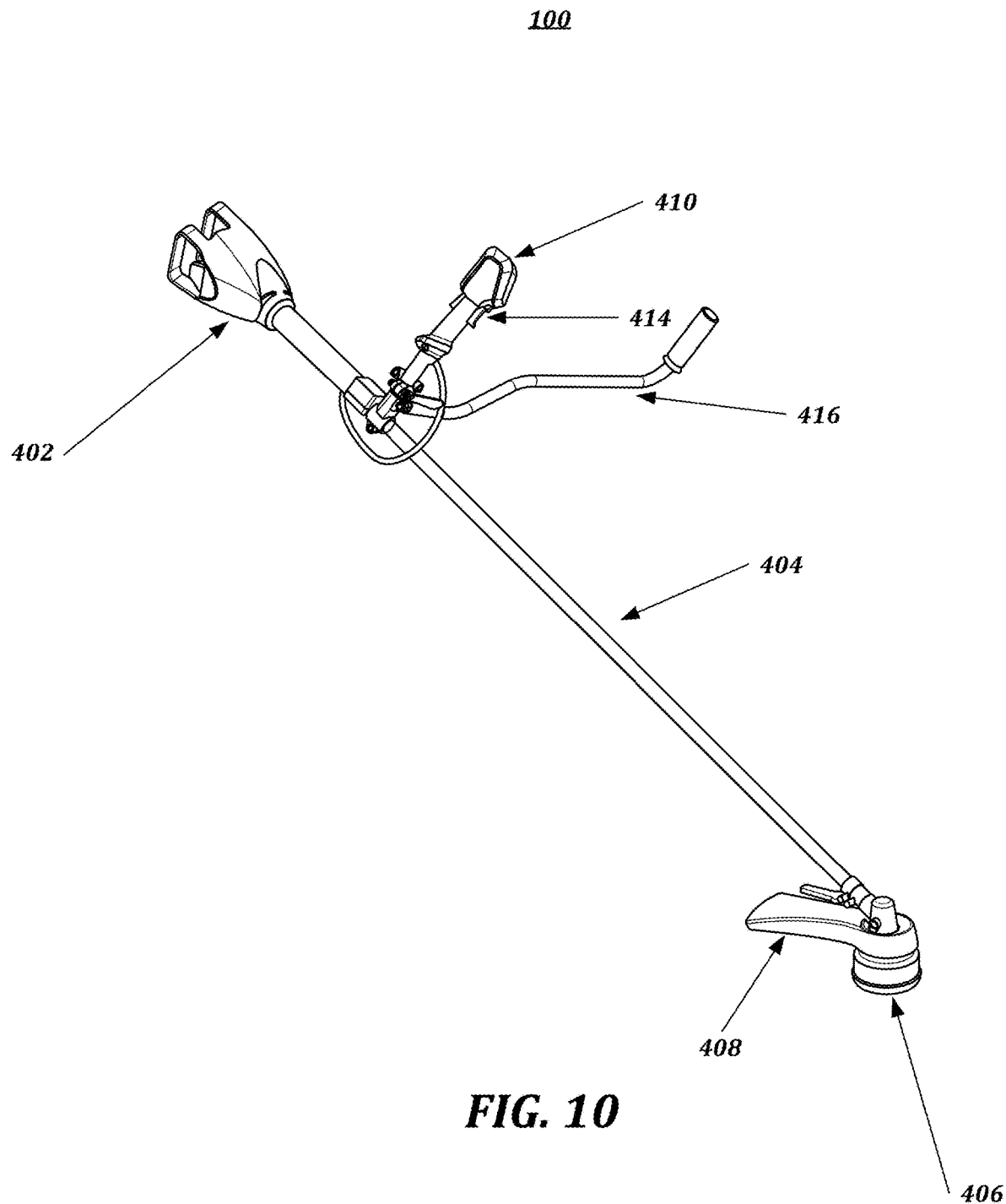
FIG. 10 further illustrates the weed trimming apparatus 100 in the second configuration.
Figure 11A:
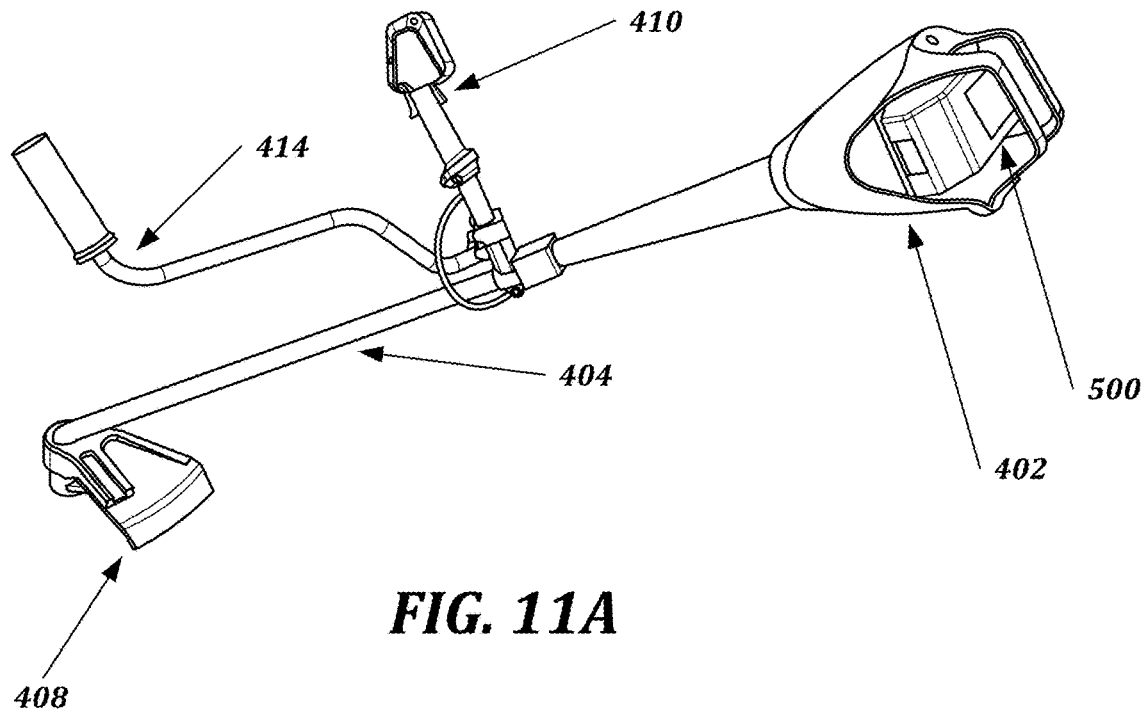
FIG. 11A illustrates a back view of the weed trimming apparatus 100 with one of one or more power sources 500.
Figure 11B:
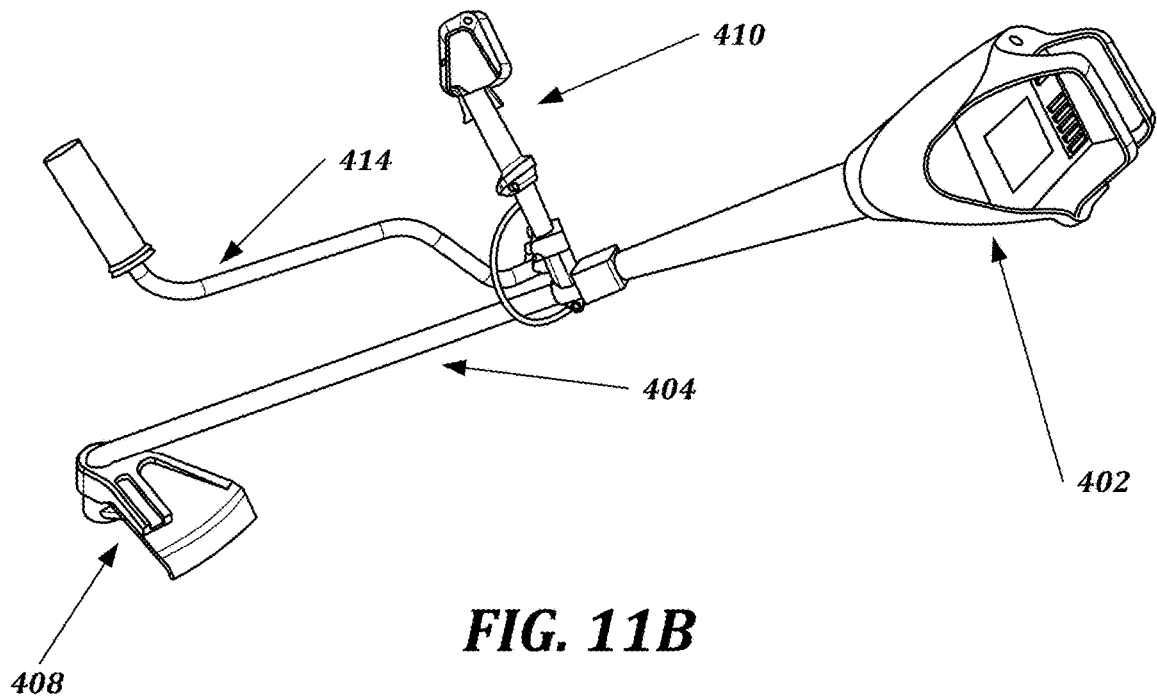
FIG. 11B illustrates a back view of the weed trimming apparatus 100 without the one or more power sources 500.

In some embodiments, the second handle 416 may comprise a handle brace 418, illustrated in at least FIGS. 1-2. The handle brace 418 may be used to secure a user's forearm to the second handle preferably when the second handle 416 is in the position parallel to the shaft 404 and extending toward the trimmer base 402. The handle brace 418 may be embodied as, but not limited to, an adjustable strap, a rigid and/or semi rigid cuff, and/or any other suitable securing means or combination thereof.

In further embodiments, the trimmer 400 may comprise a trimmer power source receiver 420. The trimmer power source receiver 420 may be used to electrically receive at least a portion of the one or more power sources 500. The trimmer power source receiver 420 may be disposed on an outer portion of the trimmer base 402. In some embodiments, the trimmer power source receiver 420 may have similar and/or the same configuration operative to interchangeably use any of the one or more power sources 500.

In further embodiments, the trimmer power source receiver 420 may comprise receiving prongs and/or other receiving element compatible with power sources of other power tools.

In further embodiments, the trimmer 400 may comprise a trimmer clip strap 422. The trimmer clip strap 422 may be used to secure the power clip second portion 304 to the trimmer 400. The trimmer clip strap 422 may be made from a flexible yet strong material capable of being torqued, rotated, and/or pulled while under tension. In some embodiments, the trimmer clip strap 422 may be disposed on an outer portion of the shaft 404 and/or the trimmer base 402. The first clip strap 206 may be disposed substantially opposite to the belt power source receiver 202. In further embodiments, the trimmer clip strap 422 may be configured to house at least a portion of the plurality of trimmer power transmission wires 426 (not shown). In other embodiments, the trimmer clip strap 422 may be configured to house a plurality of secondary trimmer power transmission wires (not shown).

D. One or More Power Sources 500

At least FIGS. 1-12 illustrate the one or more power sources 500 consistent with an embodiment of the disclosure. The one or more power sources 500 may be embodied as, but not limited to, any suitable battery and/or battery pack capable of powering the trimmer 400. The one or more power sources 500 may be used to power elements of the apparatus 100 including the trimmer 400.

E. One or More Securing Means 600

Optionally, the one or more securing means 600 (not shown) consistent with an embodiment of the disclosure may be provided. The one or more securing means 600 may be used to further secure and/or distribute weight from the belt to the user and various parts of the user. At least a portion of the one or more securing means 600 may secure to the belt 200. The one or more securing means 600 may be embodied as, but not limited to, for example, one or more shoulder straps, a (back) brace, and/or any other suitable strap or rigid portion operative to distribute torque and weight form the trimmer 400 and/or the belt 200.

III. Apparatus/System Use

Embodiments of the present disclosure provide a system operative by a set of methods comprising instructions configured to operate the aforementioned components in accordance with the methods. The following depicts an example of a method of a plurality of methods that may be performed by at least one of the aforementioned components. Various hardware components may be used at the various stages of operations disclosed with reference to each component.

For example, although methods may be described to be performed by a single component, it should be understood that, in some embodiments, different operations may be performed by different components in operative relation with one another. For example, an apparatus may be employed in the performance of some or all of the stages disclosed with regard to the methods. As such, the apparatus may comprise at least one architectural component disclosed herein.

Figure 20:
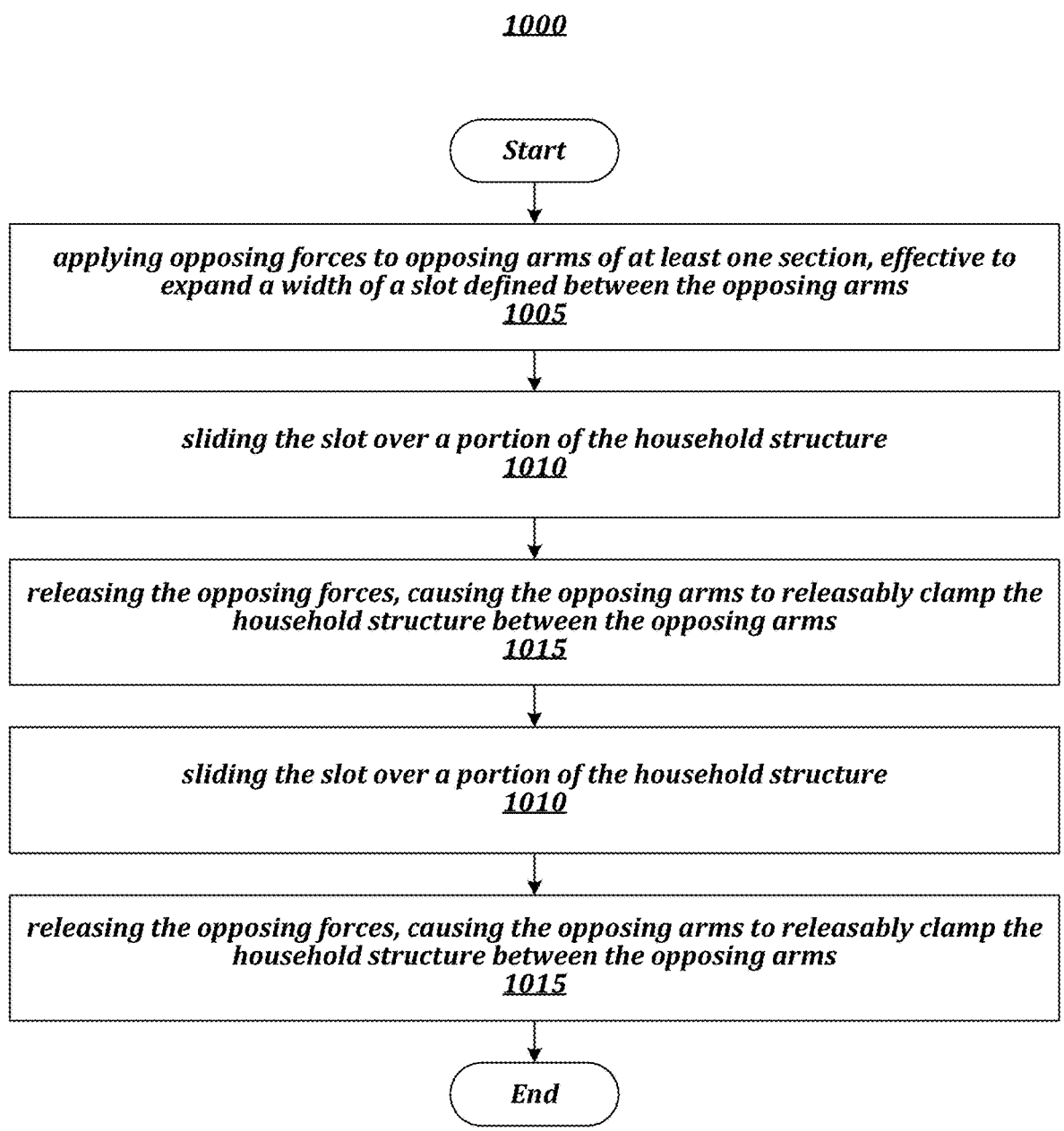
FIG. 20 is a flow chart of a method 1000 for operating a weed trimmer apparatus.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements Consistent with embodiments of the present disclosure, a method 1000 for operating a weed trimmer apparatus may be performed by at least one of the aforementioned components, illustrated at least in FIG. 20. The method may be embodied as, for example, but not limited to instructions, which when executed, perform the method. The method may comprise the following stages:

1. 1005—orienting a second handle of a trimmer such that the second handle is parallel to a shaft of the trimmer and extending toward a trimmer head of the trimmer;
2. 1010—securing a power source to a trimmer base via a trimmer power source receiver;
3. 1015—grasping a trimmer base cylindrical portion of the trimmer with a hand of a user;
4. 1020—grasping a first handle of the trimmer with another hand of the user; and
5. 1025—actuating a trigger, disposed on the first handle, by the hand of the user thereby supplying electrical power to a motor of the trimmer operatively connected to a trimmer head causing an axial rotation of the trimmer head having a plurality of cutting swatch secured thereto.

Figure 21:
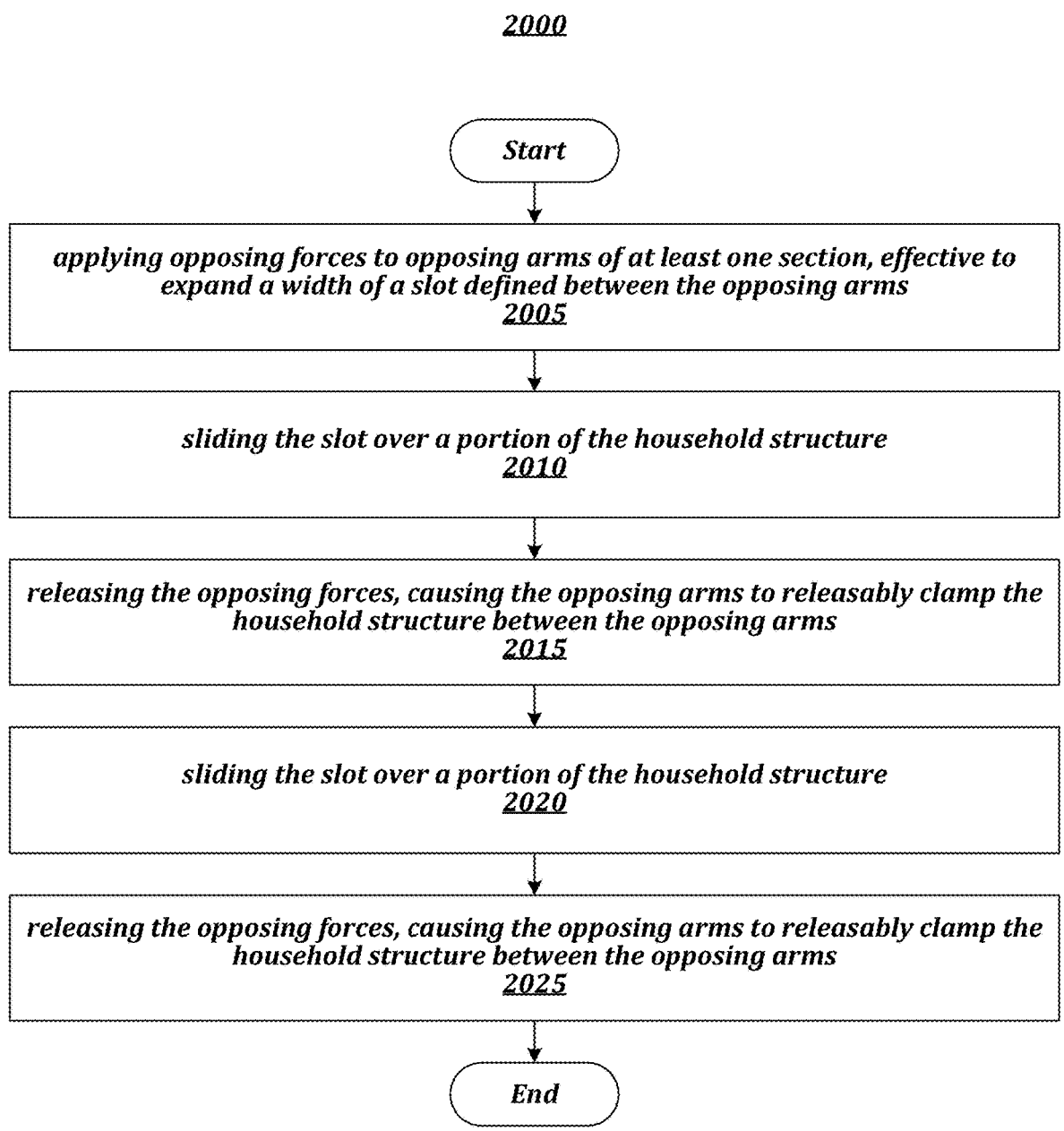
FIG. 21 is a flow chart of a method 2000 for operating a weed trimmer apparatus.

Consistent with embodiments of the present disclosure, a method 2000 for operating a weed trimmer apparatus may be performed by at least one of the aforementioned components, illustrated at least in FIG. 21. The method may be embodied as, for example, but not limited to instructions, which when executed, perform the method. The method may comprise the following stages:

1. 2005—securing a handle brace to a portion of a second handle of a trimmer at a location operative to receive a forearm of a user;
2. 2010—orienting the second handle parallel to a shaft of the trimmer and extending toward a trimmer base of the trimmer;
3. 2010—securing a power source to the trimmer base via a trimmer power source receiver;
4. 2015—securing the handle brace around a forearm of a user;
5. 2020—grasping a first handle of the trimmer with a hand associated with the corresponding forearm of the user; and
6. 2025—actuating a trigger, disposed on the first handle, by the hand of the user thereby supplying electrical power to a motor of the trimmer operatively connected to a trimmer head causing an axial rotation of the trimmer head having a plurality of cutting swatch secured thereto.

Figure 22:
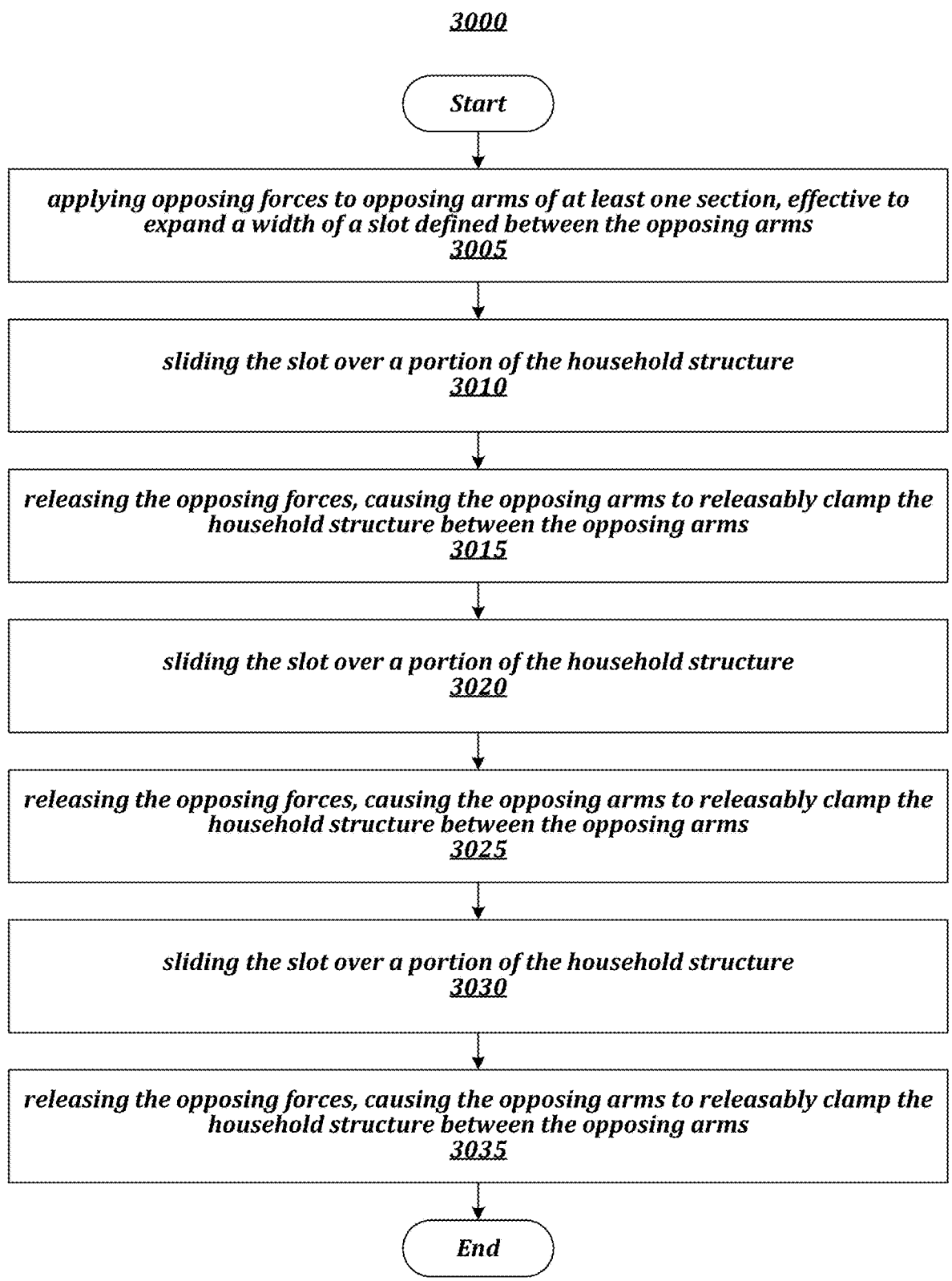
FIG. 22 is a flow chart of a method 3000 for operating a weed trimmer apparatus.

Consistent with embodiments of the present disclosure, a method 3000 for operating a weed trimmer apparatus may be performed by at least one of the aforementioned components, illustrated at least in FIG. 22. The method may be embodied as, for example, but not limited to instructions, which when executed, perform the method. The method may comprise the following stages:

1. 3005—securing a belt around a user, the belt comprising:
    a. a first clip strap secured to an outer portion of the belt on one end and secured to a power clip first portion on another end, and
    b. a belt power source receiver;
2. 3010—securing a power source to the belt power source receiver;
    a. (Alternatively) securing a power source to a trimmer base via a trimmer power source receiver;
3. 3015—securing a power clip second portion to power clip first portion, the power clip second portion being secured to the trimmer via a second clip strap;
4. 3020—orienting a second handle of a trimmer such that the second handle extends orthogonally to a shaft of the trimmer and across a torso of a user;
5. 3025—grasping a first handle of the trimmer with a hand of a user;
6. 3030—grasping the second handle of the trimmer with another hand of a user; and
7. 3035—actuating a trigger, disposed on the first handle, by the hand of the user thereby supplying electrical power to a motor of the trimmer operatively connected to a trimmer head causing an axial rotation of the trimmer head having a plurality of cutting swatch secured thereto.

Although the stages are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

IV. Aspects

The following disclose various Aspects of the present disclosure. The various Aspects are not to be construed as patent claims unless the language of the Aspect appears as a patent claim. The Aspects describe various non-limiting embodiments of the present disclosure.

Aspect 1. In some aspects, the trimmer may be secured to the belt via a ball and socket joint.

Aspect 2. In further aspects, the ball and socket joint may be embodied as a connector to a universal receiving portion secured to an outer portion of the belt.

Aspect 3. In further aspects there may universal a universal receiving portion on the trimmer, and two on the belt; all capable of receiving either the ball and socket connector and/or a power source.

Aspect 4. The weed trimmer apparatus of the present disclosure, wherein the power source is configured to be easily attachable and detachable to facilitate quick changes.

Aspect 5. The weed trimmer apparatus of the present disclosure, wherein the second handle comprises a clamping lever for adjusting and securing the position of the second handle relative to the first handle.

Aspect 6. The weed trimmer apparatus of the present disclosure, wherein the second handle is adjustable to various angles relative to the first handle.

Aspect 7. The weed trimmer apparatus of the present disclosure, wherein the power clip first portion is attached to a power clip second portion with webbing wires running through the webbing and power clip to an embedded five pin electrical connector.

Aspect 8. The weed trimmer apparatus of the present disclosure, wherein the belt comprises pockets for neatly storing excess webbing.

Aspect 9. The weed trimmer apparatus of the present disclosure, wherein a first power source is connected to the belt power receiver and a second power source is connected to the trimmer power receiver, thereby having two power sources for longer operational time of the trimmer.

V. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A weed trimmer apparatus comprising:
   a belt configured to be secured around a user's waist, the belt comprising:
      a first clip strap extending from an outer surface of the belt;
      a power clip first portion secured to the first clip strap, the power clip first portion including a first electrical connector and a first housing,
      a belt power source receiver disposed on the outer surface of the belt, wherein the belt power source receiver is electrically connected to the power clip first portion,
      a plurality of power transmission wires extending through an inner portion of the belt, wherein the plurality of transmission wires electrically connect the belt power source receiver to the power clip first portion through at least a portion of the first clip strap,
      a belt clip configured to secure one end of the belt to another end of the belt around a waist of a user;
   a trimmer disposed substantially opposite from the belt power source, comprising:
      a trimmer base comprising:
         a motor embedded within the trimmer base and configured to power the trimmer, and
         a trimmer power source receiver,
      a shaft extending from a first distal end of the trimmer base,
      a debris shield secured proximate to a first end of the shaft,
      a trimmer head secured below the debris shield to the first end the shaft and electrically connected to the motor,
      a plurality of cutting swaths secured to the trimmer head,
      a first handle portion extending orthogonally from the shaft proximate to a shaft-trimmer base junction and comprising a trigger operative to actuate the motor, and
      a second handle extending from the first handle and configured to axially rotate around the first handle, the second handle comprising a locking means configured to secure the second handle into a fixed position;
   a power source configured to releasably secure to either the belt power source receiver or the trimmer power source receiver; and
      a power clip second portion including a second electrical connector and a second housing, the power clip second portion being configured to secure to the power clip first portion, such that a connection between the first electrical connector and the second electrical connector forms an electrical connection between the power clip first portion and the power clip second portion while the power clip first portion is secured to the power clip second portion, and a physical connection between the first housing and the second housing supports the weight of the trimmer such that no stress is put on the electrical connection, and;
   wherein, when the power source is secured to the belt power source receiver and the power clip first portion is secured to the power clip second portion, the power source is configured to provide electrical output to the motor of the trimmer,
   wherein the power source, when secured to the trimmer power source receiver, is configured to provide electrical output to the motor of the trimmer.

2. The weed trimmer apparatus of claim 1, wherein the first housing comprises a pair of tension loaded arms, and the second housing comprises a pair of divots, and wherein the physical connection is formed by the divots receiving a portion of the tension loaded arms to support the weight of the trimmer without putting undue stress on the electrical connections or wires.

3. The weed trimmer apparatus of claim 1, wherein the belt is configured to transfer the weight of the trimmer and battery directly to the user's hips rather than to the user's shoulders and spine.

4. The weed trimmer apparatus of claim 1, further configured to be used by both right-handed and left-handed operators via adjusting the position of the second handle and orientation of the belt.

5. The weed trimmer apparatus of claim 1, further comprising three operative configurations.

6. The weed trimmer apparatus of claim 5, wherein in a first operative configuration:
   the second handle is positioned in line with the shaft and extending towards the trimmer head, and
   the power clip first portion is secured to the power clip second portion.

7. The weed trimmer apparatus of claim 6, wherein in a second operative configuration:
   the second handle is positioned in line with the shaft and extending towards the trimmer base,
   a cuff and strap attachment operative to receive a user's forearm secured to the second handle, and
   the power clip first portion is secured to the power clip second portion.

8. The weed trimmer apparatus of claim 7, wherein in a third operative configuration:
   the second handle is positioned orthogonally from the shaft and the first handle and extends across a user's torso, and
   the power clip first portion is secured to the power clip second portion.

9. The weed trimmer apparatus of claim 1, wherein the first electrical connector and the second electrical connector comprise a five-pin electrical configuration.

10. A weed trimmer apparatus comprising:
    a power clip comprising:
       a power clip first portion secured to a belt, the power clip first portion including a first electrical connector and a first housing, and a power clip second portion secured to a trimmer, the power clip second portion including a second electrical connector and a second housing;

wherein the power clip first portion and the power clip second portion are configured to connect, such that a connection between the first electrical connector and the second electrical connector forms an electrical connection between the power clip first portion and the power clip second portion while the power clip first portion is secured to the power clip second portion, and a physical connection between the first housing and the second housing supports the weight of the trimmer such that no stress is put on the electrical connection;

the belt comprising:
a first clip strap extending from an outer surface of the belt and secured to the power clip first portion at an extended end of the first clip strap,
a belt power source receiver disposed on the belt opposing the first clip strap, and
a plurality of second power transmission wires extending through the belt and electrically connecting the belt power source receiver to the power clip first portion;

the trimmer comprising:
a trimmer base comprising:
a motor within the trimmer base and configured to power the trimmer, and
a trimmer power source receiver,
a shaft extending from the trimmer base,
a debris shield secured proximate to a first end of the shaft,
a trimmer head secured below the debris shield to the first end the shaft and electrically connected to the motor,
a first handle portion extending orthogonally from the shaft proximate to a shaft-trimmer base junction, and
a second handle rotatably extending from the first handle and comprising a locking means configured to secure the second handle into a fixed position; and
a power source configured to releasably secure to either the belt power source receiver or the trimmer power source receiver and configured to provide electrical output to the trimmer.

11. The weed trimmer apparatus of claim 10, wherein the first housing comprises two spring-loaded arms configured to releasably lock into divots formed in the second housing.

12. The weed trimmer apparatus of claim 10, further comprising three operative configurations.

13. The weed trimmer apparatus of claim 12, wherein in a first operative configuration, the second handle is positioned in line with the shaft and extending towards the trimmer head.

14. The weed trimmer apparatus of claim 12, wherein in a second operative configuration:
the second handle is positioned in line with the shaft and extending towards the trimmer base, and
a cuff and strap attachment operative to receive a user's forearm secured to the second handle.

15. The weed trimmer apparatus of claim 12, wherein in a third operative configuration, the second handle is positioned orthogonally from the shaft and the first handle and extends across a user's torso.

16. The weed trimmer apparatus of claim 10, wherein the first handle comprises operating controls for the trimmer.

17. The weed trimmer apparatus of claim 10, wherein the belt includes a buckle connector having an operative range of motion of at least 180 degrees.

18. A weed trimmer apparatus comprising:
a power clip comprising:
a power clip first portion secured to a belt, the power clip first portion including a first electrical connector and a first housing, and
a power clip second portion secured to a trimmer, the power clip second portion including a second electrical connector and a second housing;
wherein the power clip first portion and the power clip second portion are configured to connect, such that a connection between the first electrical connector and the second electrical connector forms an electrical connection between the power clip first portion and the power clip second portion while the power clip first portion is secured to the power clip second portion, and a physical connection between the first housing and the second housing supports the weight of an object such that no stress is put on the electrical connection;

the belt comprising:
a first clip strap extending from an outer surface of the belt and secured to the power clip first portion at an extended end of the first clip strap,
a belt power source receiver disposed on the outer surface of the belt, and
a plurality of second power transmission wires extending through the belt and electrically connecting the belt power source receiver to the power clip first portion;

the trimmer comprising:
a trimmer base comprising:
a motor within the trimmer base and configured to power the trimmer, and
a trimmer power source receiver,
a shaft extending from the trimmer base,
a trimmer head and debris shield secured proximate to a first end of the shaft and electrically connected to the motor,
a first handle portion extending orthogonally from the shaft and comprising operating controls for the trimmer, and
a second handle extending from the first handle, the second handle comprising three operative configurations comprising:
the second handle positioned in line with the shaft and extending towards the trimmer head,
the second handle comprising a cuff and strap attachment operative to receive a user's forearm and positioned in line with the shaft and extending towards the trimmer base, and
the second handle positioned orthogonally from the shaft and the first handle, and extending across a user's torso; and
a power source configured to releasably secure to either the belt power source receiver or the trimmer power source receiver and configured to provide electrical output to the trimmer.

19. The weed trimmer apparatus of claim 18, wherein a distal end of the first handle comprises a flange operative to restrict motion of a user's hand when gripping the first handle.

20. The weed trimmer apparatus of claim 18, wherein the first electrical connector and the second electrical connector comprise an embedded five-pin electrical connector.

\* \* \* \* \*